US011145048B2

(12) United States Patent
Moteki et al.

(10) Patent No.: US 11,145,048 B2
(45) Date of Patent: Oct. 12, 2021

(54) IMAGE PROCESSING APPARATUS, IMAGE PROCESSING METHOD, AND NON-TRANSITORY COMPUTER-READABLE STORAGE MEDIUM FOR STORING PROGRAM

(71) Applicant: FUJITSU LIMITED, Kanagawa (JP)

(72) Inventors: Atsunori Moteki, Inagi (JP); Yu Ishikawa, Yokohama (JP); Toshiyuki Yoshitake, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/918,433

(22) Filed: Jul. 1, 2020

(65) Prior Publication Data

US 2021/0027456 A1 Jan. 28, 2021

(30) Foreign Application Priority Data

Jul. 24, 2019 (JP) .............................. JP2019-136504

(51) Int. Cl.
*G06T 7/00* (2017.01)
*G06T 7/543* (2017.01)
*G06T 7/73* (2017.01)

(52) U.S. Cl.
CPC ............ *G06T 7/0004* (2013.01); *G06T 7/543* (2017.01); *G06T 7/73* (2017.01)

(58) Field of Classification Search
CPC .......... H04N 2201/0081; H04N 1/1912; G06T 7/001; G06T 7/0004
See application file for complete search history.

(56) References Cited

U.S. PATENT DOCUMENTS 5,171,963 A * 12/1992 Saruta ................ B23K 26/0853
219/121.69
5,534,704 A * 7/1996 Robinson ................ G06E 3/005
250/550
(Continued)

FOREIGN PATENT DOCUMENTS

JP 2007-249591 A 9/2007
JP 2008-185514 A 8/2008
(Continued)

OTHER PUBLICATIONS

Zhengyou Zhang, "A Flexible New Technique for Camera Calibration", IEEE Transactions on Pattern Analysis and Machine Intelligence, vol. 22, No. 11, pp. 1330-1334, Nov. 2000 (Total 5 pages).
(Continued)

*Primary Examiner* — Yosef Kassa
(74) *Attorney, Agent, or Firm* — Fujitsu Patent Center

(57) ABSTRACT

An image processing method includes: detecting a plurality of feature lines from a first image captured from a first position; specifying, based on a positional relationship between the plurality of feature lines and a plurality of projection lines generated by projecting each of a plurality of line segments onto the first image, a feature line representing a defective portion of a shape of an object; setting a plurality of candidate positions based on the first position, each of the plurality of candidate positions being a candidate for a second position at which a second image is captured; calculating an evaluation value of each of the plurality of candidate positions; determining any of the plurality of candidate positions based on the evaluation value of each of the plurality of candidate positions; and outputting first information to be used in recognition of the determined candidate position.

18 Claims, 30 Drawing Sheets

(56) References Cited

U.S. PATENT DOCUMENTS

| | | | | |
|---|---|---|---|---|
| 6,640,002 B1* | 10/2003 | Kawada | ............... | G06T 7/0004 348/87 |
| 7,102,743 B2* | 9/2006 | Tsuji | ................. | G01N 21/9503 356/237.2 |
| 7,764,826 B2* | 7/2010 | Miyamoto | .............. | H01J 37/28 382/149 |
| 7,903,249 B2* | 3/2011 | Yoshida | ........... | G01N 21/95607 356/445 |
| 2011/0218776 A1 | 9/2011 | Shono et al. | | |
| 2012/0027289 A1 | 2/2012 | Naruse et al. | | |
| 2017/0287154 A1 | 10/2017 | Yamaguchi | | |
| 2018/0089836 A1 | 3/2018 | Yamaguchi et al. | | |
| 2019/0287233 A1 | 9/2019 | Moteki et al. | | |

FOREIGN PATENT DOCUMENTS

| | | |
|---|---|---|
| JP | 2011-185650 A | 9/2011 |
| JP | 2012-32344 A | 2/2012 |
| JP | 2017-068849 A | 4/2017 |
| JP | 2017-182302 A | 10/2017 |
| JP | 2018-55199 A | 4/2018 |
| JP | 2019-70898 A | 5/2019 |
| JP | 2019-158628 A | 9/2019 |

OTHER PUBLICATIONS

Rafael Grompone von Gioi et al.,"LSD: a Line Segment Detector", Image Processing On Line, 2 (2012), pp. 35-55, Mar. 24, 2012 (Total 21 pages) http://dx.doi.org/10.5201/ipol.2012.gjmr-lsd.

Lawrence Gilman Roberts,"Machine Perception of Three-dimensional Solids", Massachusetts Institute of Technology, Lincoln Lab. Rep., TR3315, pp. 1-82, May 1963 (Total 82 pages).

Chi Xu et al.,"Pose Estimation From Line Correspondences: A Complete Analysis and a Series of Solutions", IEEE Transactions on Pattern Analysis and Machine Intelligence, vol. 39, No. 6, pp. 1209-1222, Jun. 2017 (Total 14 pages).

* cited by examiner

FIG. 6

| ID | STARTING POINT [mm] | ENDING POINT [mm] |
|---|---|---|
| 1 | (0,0,0) | (0,0,15) |
| 2 | (0,10,0) | (0,15,10) |
| ... | ... | ... |
| 20 | (25,15,10) | (25,15,30) |

FIG. 8

| 3D LINE SEGMENT ID | 3D LINE SEGMENT STARTING POINT, ENDING POINT [mm] | FIRST VIEWPOINT FEATURE LINE ID | FIRST VIEWPOINT FEATURE LINE STARTING POINT, ENDING POINT [pixel] |
|---|---|---|---|
| 1 | ( 0, 0, 0), ( 0, 0, 15) | 43 | (327.9, 242.1), (362.8, 289.4) |
| 2 | ( 0, 10, 0), ( 0, 15, 10) | 86 | (432.6, 90.4), (492.3, 144.7) |
| 3 | (20, 10, 0), (30, 10, 0) | 3 | ( 24.0, 378.3), ( 54.2, 409.8) |
| 4 | (25, 15, 10), (25, 15, 30) | 47 | (284.5, 452.2), (314.7, 488.3) |
| 5 | ( 0, 15, 0), ( 0, 15, 10) | 92 | ( 20.9, 96.3), ( 50.2, 130.5) |

FIG. 18

| 3D LINE SEGMENT ID | 3D LINE SEGMENT STARTING POINT, ENDING POINT [mm] | FIRST VIEWPOINT FEATURE LINE ID | FIRST VIEWPOINT FEATURE LINE STARTING POINT, ENDING POINT [mm] | FLAG | SECOND VIEWPOINT FEATURE LINE ID | SECOND VIEWPOINT FEATURE LINE STARTING POINT, ENDING POINT [mm] |
|---|---|---|---|---|---|---|
| 1 | ( 0, 0, 0), ( 0, 0, 15) | 43 | (327.9, 242.1), (362.8, 289.4) | True | 16 | (623.2, 443.1),(266.8, 82.9) |
| 2 | ( 0, 10, 0), ( 0, 15, 10) | 86 | (432.6, 90.4), (492.3, 144.7) | False | ---- | ---- |
| 3 | (20, 10, 0), (30, 10, 0) | 3 | ( 24.0, 378.3), ( 54.2, 409.8) | False | ---- | ---- |
| 4 | (25, 15, 10), (25, 15, 30) | 47 | (284.5, 452.2), (314.7, 488.3) | True | 53 | (184.5, 54.0),(122.3, 438.8) |
| 5 | ( 0, 15, 0), ( 0, 15, 10) | 92 | ( 20.9, 96.3), ( 50.2, 130.5) | False | ---- | ---- |

FIG. 20

| 3D LINE SEGMENT ID | 3D LINE SEGMENT STARTING POINT, ENDING POINT [mm] | FIRST VIEWPOINT FEATURE LINE ID | FIRST VIEWPOINT FEATURE LINE STARTING POINT, ENDING POINT [mm] | FLAG |
|---|---|---|---|---|
| 1 | ( 0, 0, 0), ( 0, 0, 15) | 43 | (327.9, 242.1), (362.8, 289.4) | True |
| 2 | ( 0, 10, 0), ( 0, 15, 10) | 86 | (432.6, 90.4), (492.3, 144.7) | False |
| 3 | (20, 10, 0), (30, 10, 0) | 3 | ( 24.0, 378.3), ( 54.2, 409.8) | False |
| 4 | (25, 15, 10), (25, 15, 30) | 47 | (284.5, 452.2), (314.7, 488.3) | True |
| 5 | ( 0, 15, 0), ( 0, 15, 10) | 92 | ( 20.9, 96.3), ( 50.2, 130.5) | False |

| SECOND VIEWPOINT FEATURE LINE ID | SECOND VIEWPOINT FEATURE LINE STARTING POINT, ENDING POINT [mm] | DEVIATION AMOUNT [mm] |
|---|---|---|
| 16 | (623.2, 443.1),(266.8, 82.9) | 13.1 |
| ---- | ---- | |
| ---- | ---- | |
| 53 | (184.5, 54.0),(122.3, 438.8) | 19.2 |
| ---- | ---- | |

IMAGE PROCESSING APPARATUS, IMAGE PROCESSING METHOD, AND NON-TRANSITORY COMPUTER-READABLE STORAGE MEDIUM FOR STORING PROGRAM

CROSS-REFERENCE TO RELATED APPLICATION

This application is based upon and claims the benefit of priority of the prior Japanese Patent Application No. 2019-136504, filed on Jul. 24, 2019, the entire contents of which are incorporated herein by reference.

FIELD

The embodiment discussed herein is related to an image processing apparatus, an image processing method, and a non-transitory computer-readable storage medium for storing a program.

BACKGROUND

In recent years, a system for displaying an image using an augmented reality (AR) technique is becoming widespread. In an example of the AR technique, an object is photographed using a camera mounted on a personal computer (PC), a portable terminal apparatus, or the like, and a position and a posture of the camera in a three-dimensional space are estimated from an image of the object. Based on the determined position and the posture of the camera, content information is superimposed and displayed at any position in the image.

In the field of manufacturing a product, an inspection of the product is often performed by a skilled worker over a long period of time using a dedicated jig. However, if a worker other than the skilled worker may easily perform the inspection, inspection costs may be reduced.

In connection with the inspection of the product, a technique for acquiring three-dimensional information from image data obtained by imaging a target object with a plurality of cameras and collating the acquired three-dimensional information with three-dimensional model data to perform three-dimensional recognition on the target object is known.

A technique for estimating a position of an imaging device using a predetermined number of combinations in which projection lines obtained by projecting candidate lines included in shape information of an object onto an image and feature lines detected from the image are associated with each other is known.

A technique for narrowing down line segments obtained from shape information of an object based on a position of a viewpoint at which the object having a posture similar to the posture of a target object reflected in a captured image is observed is also known, A technique for generating a plurality of pieces of association information representing a predetermined number of combinations in which a predetermined number of candidate lines included in the shape information of the object are associated with a predetermined number of feature lines detected from the image and determining an association result based on an error between the pieces of association information is also known.

A technique for displaying statistical information of an error indicating a displacement amount between an edge position of a work image and a position over a master image corresponding to the edge position along the edge position is also known.

Techniques such as camera calibration, line segment detection, three-dimensional machine perception, and posture estimation by straight line correspondence are also known.

Examples of the related art include Japanese Laid-Open Patent Publication No. 2011-185650, Japanese Laid-open Patent Publication No. 2017-182302, Japanese Laid-open Patent Publication No. 2019-70898, Japanese Laid-open Patent Publication No. 2018-55199, and Japanese Laid-open Patent Publication No. 2012-32344.

Examples of the related art include Z. Zhang, "A Flexible New Technique for Camera Calibration", IEEE Transactions on Pattern Analysis and Machine Intelligence, Vol. 22, No. 11, pp. 1330-1334, November 2000, R. G. Gioi et al., "LSD: a Line Segment Detector", Image Processing On Line, 2 (2012), pp. 35-55, March 2012, L. G. Roberts, "Machine perception of three dimensional solids", MIT Lincoln Lab. Rep., TR3315, pp. 1-82, May 1963, and C. Xu et al., "Pose Estimation from Line Correspondences A Complete Analysis and a Series of Solutions", IEEE Transactions on Pattern Analysis and Machine Intelligence, Vol. 39, No. 6, pp. 1209-1222, June 2017.

SUMMARY

According to an aspect of the embodiments, an image processing method executed by a computer, the method includes: executing a detection processing that includes detecting a plurality of feature lines from a first image photographed by an imaging device from a first photographing position; executing a specifying processing that includes specifying, based on a positional relationship, a first feature line from among the plurality of feature lines, the first feature line being a feature line representing a defective portion of a shape of an object in the first image, the positional relationship being a relation between a plurality of projection lines and the plurality of feature lines, the plurality of projection line being generated by projecting each of a plurality of line segments onto the first image, each of the plurality of line segments being a line segment that is defined in shape information associated with the object and that represents the shape of the object; executing a calculation processing that includes setting a plurality of candidate positions based on the first photographing position, each of the plurality of candidate positions being a candidate for a second photographing position at which a second image including the object is photographed by the imaging device, and calculating an evaluation value of each of the plurality of candidate positions; executing a determination processing that includes determining any one of the plurality of candidate positions based on the evaluation value of each of the plurality of candidate positions; and executing an output processing that includes outputting first information to be used in recognition of the determined candidate position.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates CAD data;

FIG. 8 illustrates a corresponding pair set;

FIG. 18 illustrates a corresponding pair et to which a feature line at the second viewpoint is added;

FIG. 20 illustrates a corresponding pair set to which a deviation amount is added;

DESCRIPTION OF EMBODIMENT(S)

As an application of the AR technique, manufacturing diagnosis may be performed by superimposing computer-aided design (CAD) data representing a three-dimensional shape of a product manufactured in the field on an image of the product. In this case, in order to accurately estimate a deviation amount between a shape represented by the CAD data and the shape of the product, it is desirable to photograph an object from two different viewpoints, detect a feature line from an image photographed at each viewpoint, and restore a ridgeline of the object from the detected feature line.

However, when the user is not familiar with the technique, it is difficult to specify an appropriate viewpoint position.

Such a problem occurs not only in the case of performing the manufacturing diagnosis of the product using CAD data but also in the case of inspecting the shape of the object using other shape information.

In one aspect, an object of the embodiment is to present an appropriate photographing position when restoring a three-dimensional line segment of an object using an image obtained by photographing the object.

According to the embodiment, when restoring a three-dimensional line segment of an object using an image of the object, an appropriate photographing position may be presented.

Hereinafter, an embodiment will be described in detail with reference to the drawings.

In the manufacturing diagnosis, it is desirable not only to superimpose CAD data on an image but also to highlight a defective portion of a product in the manufacturing process that does not coincide with a shape represented by the CAD data or to quantitatively display a deviation amount between the shape represented by the CAD data and a shape of the product.

Therefore, a method of combining the techniques of Japanese Laid-open Patent Publication No. 2017-182302 and Japanese Laid-open Patent. Publication No. 2012-32344 may be considered. In this method, an error between a position of a projection line obtained by projecting a 3D line segment included in the CAD data onto an image of a product and a position of a feature line detected from the image is calculated, and the calculated error is converted into a distance in a three-dimensional space, thereby obtaining a deviation amount.

However, when a 3D line segment is projected onto an image, information in the depth direction of the image is lost, and thus an estimated value of the deviation amount is smaller than a true deviation amount unless a portion where the shape represented by the CAD data and the shape of the product are deviated from right in front is photographed.

Figure 1:
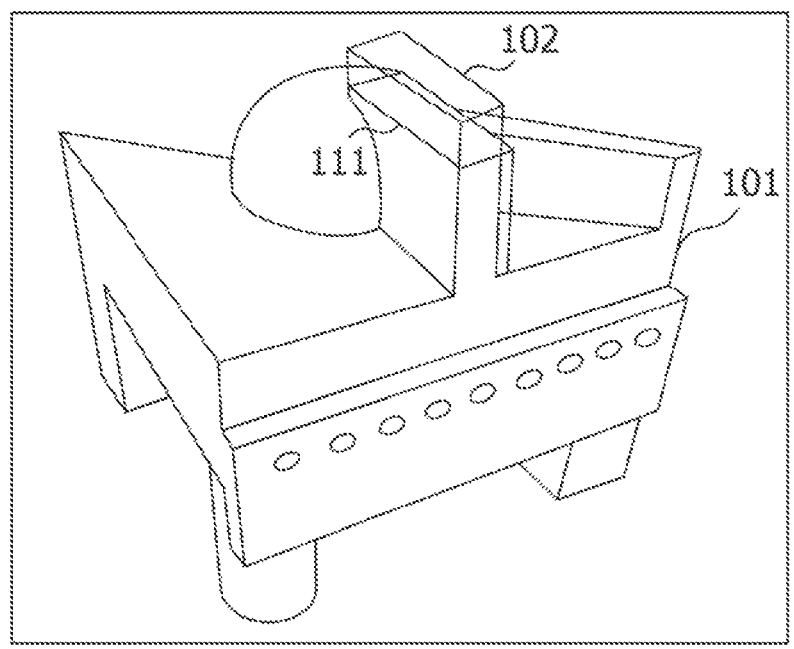
FIG. 1 illustrates 3D line segments projected onto an image of an object.

FIG. 1 illustrates an example of a 3D line segment projected onto an image of an object. In this example, the true deviation amount between a protrusion 111 of an object 101 reflected in the image and a 3D line segment of CAD data 102 superimposed on the object 101 is 1 mm. However, an error between a projection line obtained by projecting the CAD data 102 onto the image and a feature line detected from the image is obtained in pixel units, and a deviation amount obtained by converting the error in pixel units into a distance in a three-dimensional space is smaller than 1 mm.

In this case, in order to improve an estimation accuracy of the deviation amount, it is desirable to photograph the object from two different viewpoints, detect the feature line from an image photographed at each viewpoint, and restore a ridgeline of the object from the detected feature line. By directly calculating a three-dimensional deviation amount between the 3D line segment of the CAD data and the restored ridgeline, a value close to the true deviation amount may be obtained.

Figure 2:
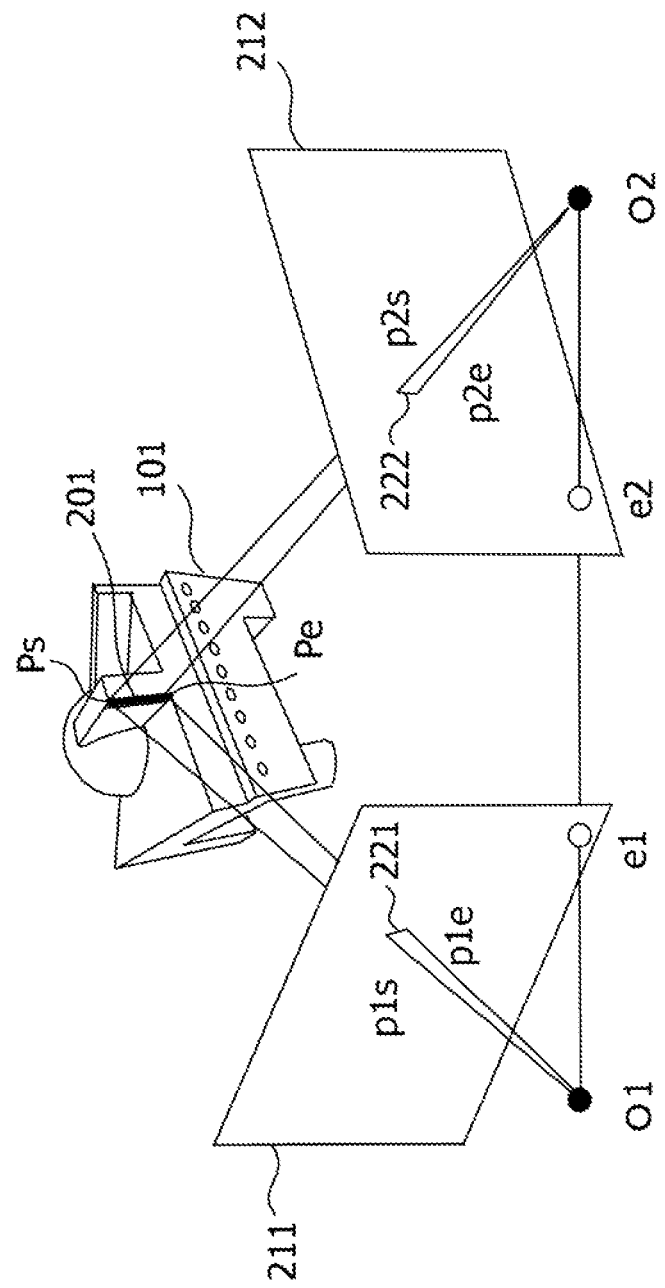
FIG. 2 illustrates restoration processing.

FIG. 2 illustrates an example of restoration processing for restoring a ridgeline of the object. Over an image plane 211 of an image obtained by photographing the object 101 from a viewpoint O1 by a camera, a point p1$s$ indicating a point Ps over the object 101 and a point pie indicating a point. Pe over the object 101 are reflected. Over an image plane 212 of the image of the object 101 obtained by photographing the object 101 from a viewpoint O2 by the camera, a point pts indicating the point Ps over the object 101 and a point p2e indicating the point Pe over the object 101 are reflected. The viewpoint O1 and the viewpoint O2 correspond to the camera center (optical center).

An epipole e1 over the image plane 211 is a point where the viewpoint O2 is projected onto the image plane 211, and an epipole e2 over the image plane 212 is a point where the viewpoint O1 is projected onto the image plane 212. A ridgeline 201 connecting the point Ps and the point Pe over the object 101 is detected as a feature line 221 connecting the point p1s and the point pie over the image plane 211, and is detected as a feature line 222 connecting the point pts and the point p2e over the image plane 212. The three-dimensional ridgeline 201 may be restored by the geometric calculation using the feature lines 221 and 222.

When a user holding a camera moves to the viewpoint O2 after photographing the object 101 from the viewpoint O1, if the distance between the viewpoint O1 and the viewpoint O2, which is the moving distance of the user, is too small, an restoration accuracy of the ridgeline 201 decreases. On the other hand, when the distance between the viewpoint O1 and the viewpoint O2 is too large, there is a possibility that the ridgeline 201 may not be observed from the viewpoint O2 due to self-shielding, or the feature line 222 is may not be detected over the image plane 212 due to a change in illumination light.

However, when the user is not familiar with the technique, the position of the appropriate viewpoint O2 is unknown, and thus restoration of the ridgeline 201 may fail when the object 101 is photographed from the inappropriate viewpoint O2. When the user moves again and repeats photographing after the restoration of the ridgeline 201 fails, a user's work load increases and convenience is impaired.

Figure 3:
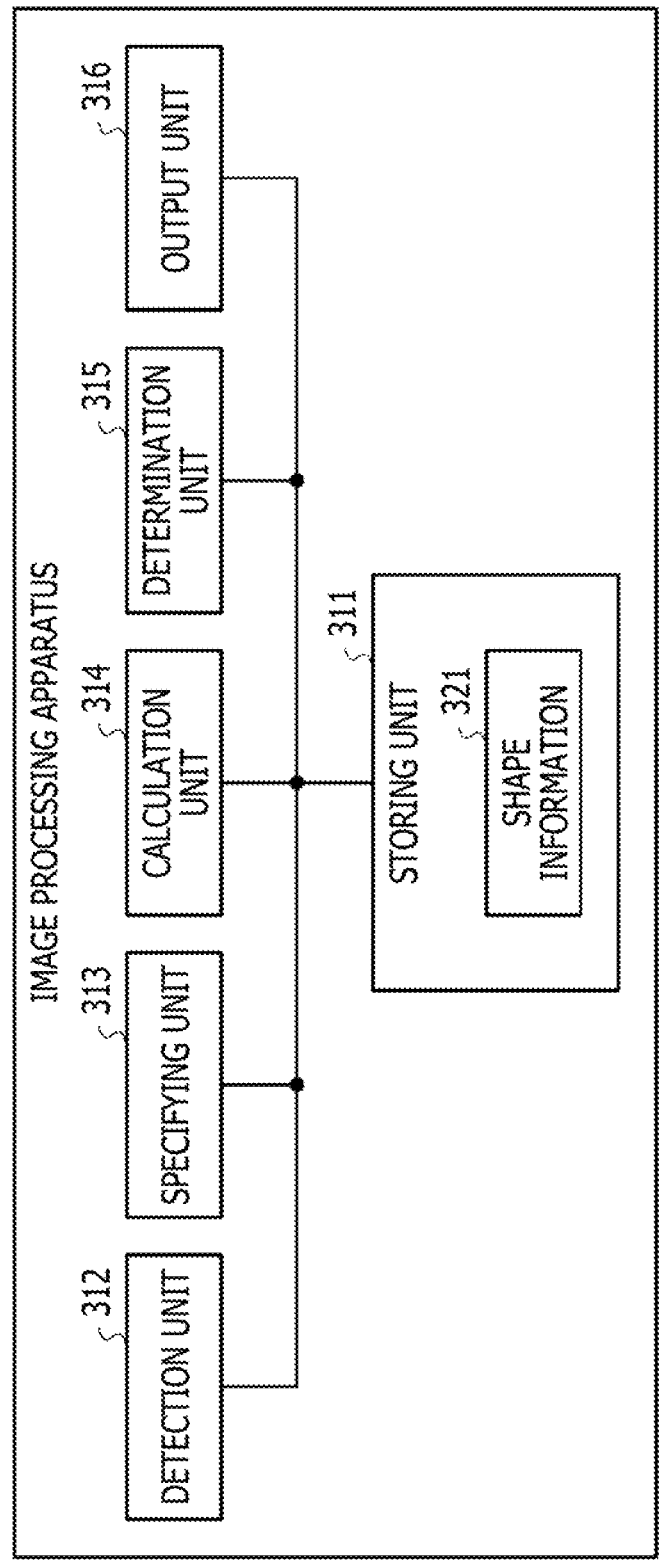
FIG. 3 is a functional configuration diagram of an image processing apparatus.
Figure 4:
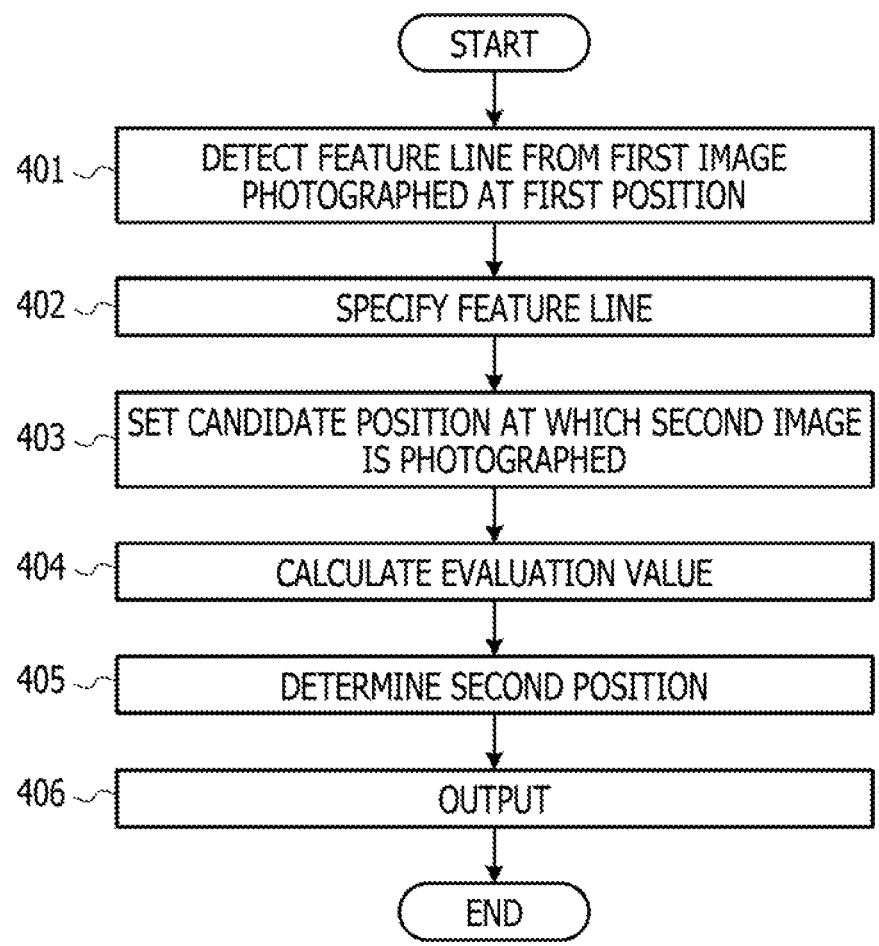
FIG. 4 is a flowchart of image processing.

FIG. 3 illustrates an example of a functional configuration of the image processing apparatus according to the embodiment. An image processing apparatus 301 of FIG. 3 includes a storing unit 311, a detection unit 312, a specifying unit 313, a calculation unit 314, a determination unit 315, and an output unit 316, The storing unit 311 stores shape information 321 including a plurality of line segments representing the shape of the object. The detection unit 312, the specifying unit 313, the calculation unit 314, the determination unit 315, and the output unit 316 perform image processing using the shape information 321, FIG. 4 is a flowchart illustrating an example of image processing performed by the image processing apparatus 301 in FIG. 3. First, the detection unit 312 detects a plurality of feature fines from a first image including an object photographed by an imaging device at the first photographing position (step 401). Next, the specifying unit 313 specifies, based on a positional relationship between a plurality of projection lines generated by projecting each of the plurality of line segments onto a first image and the plurality of feature lines, a feature line representing a defective portion of the shape of the object among the plurality of feature lines (step 402).

Next, the calculation unit 314 sets a plurality of candidate positions that are candidates for a second photographing position at which a second image including the object is photographed by the imaging device, based on the first photographing position (step 403). Then, the calculation unit 314 calculates an evaluation value for each of the plurality of candidate positions (step 404).

Next, the determination unit 315 determines any one of the plurality of candidate positions based on the evaluation value of each of the plurality of candidate positions (step 405). The output unit 316 outputs information that enables recognition of the determined candidate position (step 406).

According to the image processing apparatus 301 of FIG. 3, when restoring a three-dimensional line segment of an object using an image obtained by photographing the object, an appropriate photographing position may be presented.

Figure 5:
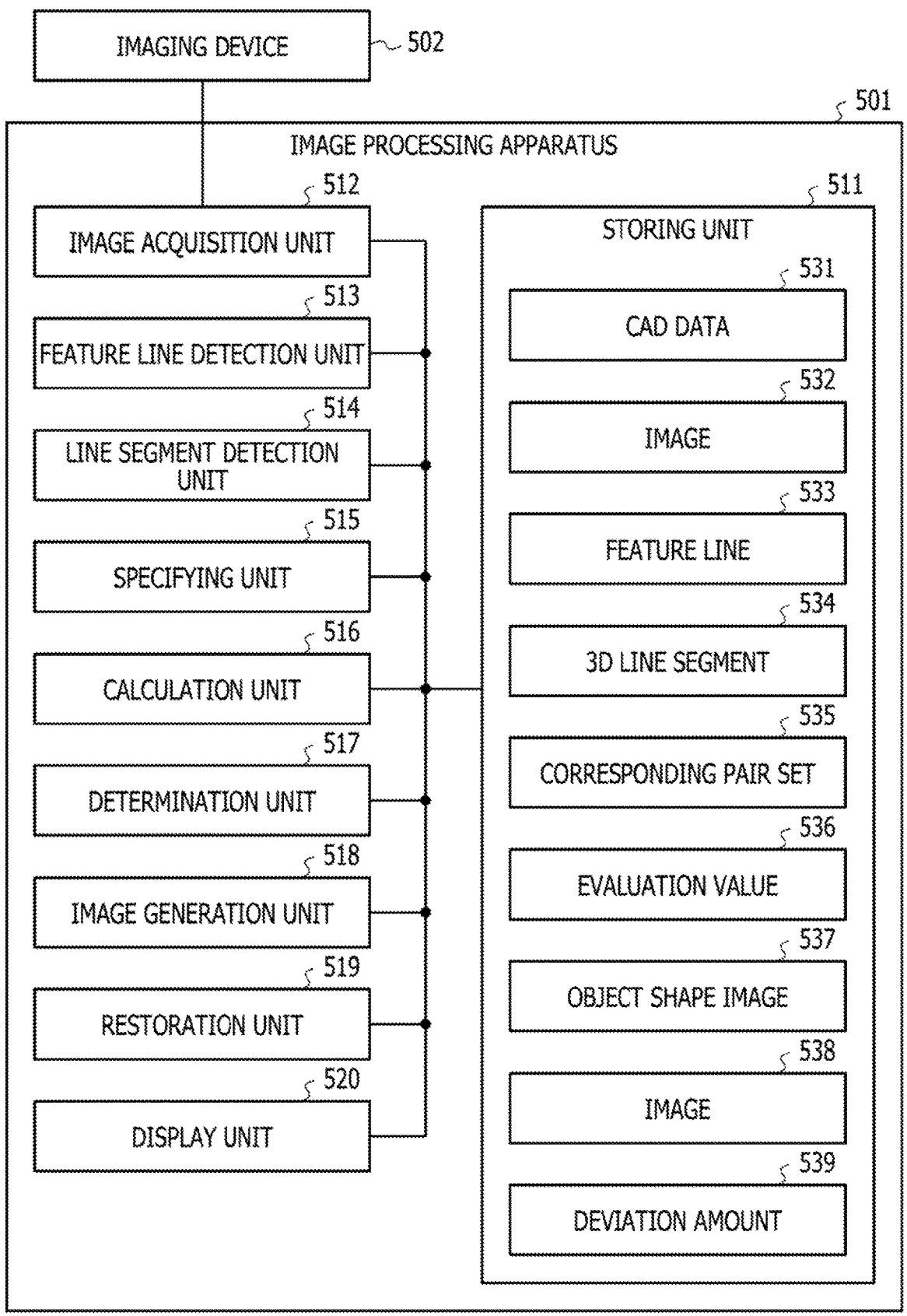
FIG. 5 is a functional configuration diagram illustrating a first specific example of the image processing apparatus.

FIG. 5 illustrates a first specific example of the image processing apparatus 301 in FIG. 3. An image processing apparatus 501 in FIG. 5 includes a storing unit 511 an image acquisition unit 512, a feature line detection unit 513, a line segment detection unit 514, a specifying unit 515, a calculation unit 516, a determination unit 517, an image generation unit 518, and a restoration unit 519, and a display unit 520.

The storing unit 511, the feature line detection unit 513, the specifying unit 515, the calculation unit 516, the determination unit 517, and the display unit 520 correspond to the storing unit 311, the detection unit 312, the specifying unit 313, the calculation unit 314, and the determination unit 315, and the output unit 316 in FIG. 3, respectively.

For example, the image processing apparatus 501 is used in shape inspection for inspecting the shape of an object using shape information of the object. The image processing apparatus 501 may be a portable terminal apparatus such as a tablet, a notebook personal computer (PC), and a smart device.

The storing unit 511 stores CAD data 531. The CAD data 531 corresponds to the shape information 321 in FIG. 3 and includes vertex information of a plurality of vertices representing a three-dimensional shape of the object and line segment information of a plurality of line segments. The vertex information includes three-dimensional coordinates of each vertex of the object, and the line segment information includes identification information indicating vertices at both ends of each line segment, or three-dimensional coordinates of vertices at both ends of each line segment. The CAD data 531 may be OW format data.

FIG. 6 illustrates an example of the CAD data 531. The CAD data 531 in FIG. 6 includes an ID, a starting point, and an ending point. The ID represents the identification information of the line segment, the starting point represents the three-dimensional coordinates of one end point of the line segment, and the ending point represents the three-dimensional coordinates of the other end point of the line segment. In this example, the unit of the three-dimensional coordinates is mm.

An imaging device 502 is, for example, a camera having an imaging element such as a charged-coupled device (CCD) or a complementary metal oxide semiconductor (CMOS), and may be mounted on a portable terminal apparatus. The user uses the imaging device 502 to photograph an image 532 of the object represented by the CAD data 531 from the first viewpoint. The image acquisition unit 512 acquires the image 532 from the imaging device 502 and stores the image 532 in the storing unit 511. The first viewpoint is an example of the first photographing position, and the image 532 is an example of the first image.

The feature line detection unit 513 performs edge detection processing, detects a plurality of edge lines from the image 532, and stores the detected edge lines as a feature line 533 in the storing unit 511. The feature line detection unit 513 may detect an edge line from the image 532 by using, for example, the technique described in R. G. Gioi et al., "LSD: a Line Segment Detector", Image Processing On Line, 2 (2012), pp. 35-55, March 2012. The line segment detection unit 514 detects a plurality of line segments included in the CAD data 531 and stores the plurality of detected line segments as a plurality of 3D line segments 534 in the storing unit 511.

The specifying unit 515 sets an initial position and an initial posture of the imaging device 502 in the three-dimensional space. First, the specifying unit 515 projects the object represented by the CAD data 531 onto the image 532, and the display unit 520 displays the image 532 and the shape of the object over a screen.

Figure 7:
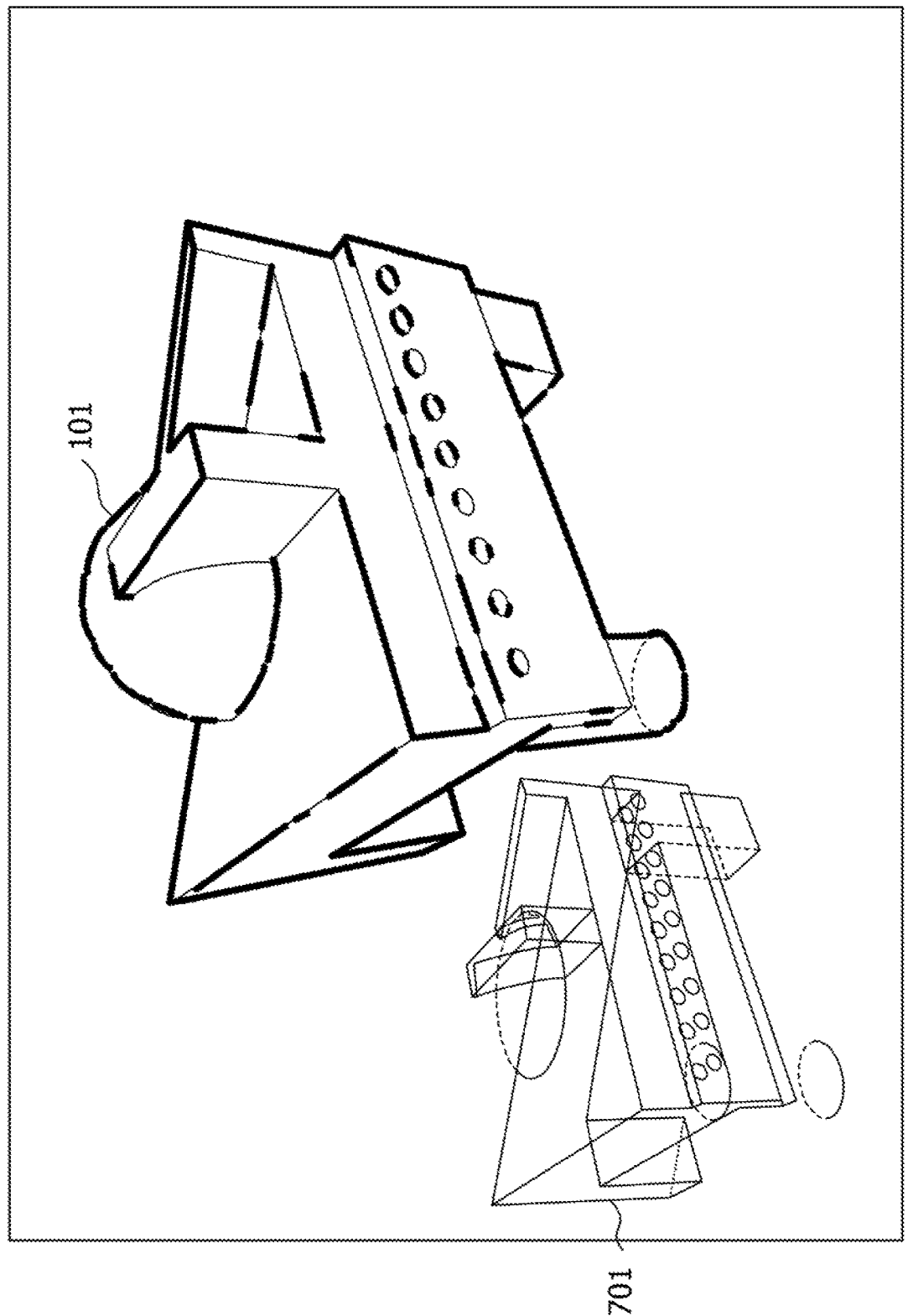
FIG. 7 illustrates an image displayed over a screen.

FIG. 7 illustrates an example of the image 532 and the shape of the object displayed over the screen. In the center of the screen, the object 101 reflected in the image 532 is displayed, and over the object 101, the feature line 533 detected from the object 101 is displayed. A 3D line segment 534 detected from the CAD data 531 is projected onto the lower left of the object 101, and a shape 701 of the object is displayed using the projection line of the 3D line segment 534.

The user performs an operation of changing the position and the posture of the shape 701 over the screen so that the position and the posture of the shape 701 approximate the object 101. By changing the position and the posture of the shape 701 over the screen, the position and the posture of the viewpoint with respect to the screen change. Therefore, the specifying unit 515 uses the position and posture of the viewpoint corresponding to the position and the posture of the shape 701 determined by the user as an initial position and an initial posture of the imaging device 502.

Next, the specifying unit 515 removes 3D line segments (hidden lines) that are not observed from the viewpoint among the 3D line segments included in the shape 701. The specifying unit 515 may remove the hidden lines by using, for example, the technique described in L. G. Roberts, "Machine perception of three dimensional solids", MIT Lincoln Lab, Rep., TR3315, pp. 1-82, May 1963.

The specifying unit 515 may also automatically determine the initial position and the initial posture of the imaging device 502 using the technique described in Japanese Laid-open Patent Publication No. 2019-70898. According to this technology, posture information representing the position and the posture of an object observed from each of a plurality of viewpoints in a three-dimensional space, a viewpoint image of the observed object, and a feature amount extracted from the viewpoint image are stored in a storing unit in association with each other. Then, the similarity between a feature amount of the image captured by the imaging device and a feature amount of each viewpoint image is calculated, and the posture information of the viewpoint image having the maximum similarity is determined as the initial position and the initial posture of the object.

The initial position and the initial posture are the temporary position and posture, and may not be coincided with the position and the posture of the imaging device 502 at the first viewpoint.

Next, the user designates k (k is a predetermined integer of 4 or more) combinations of the projection lines and the feature lines from among the projection lines of the 3D line segment 534 and the feature lines 533 displayed over the screen. The specifying unit 515 stores, in the storing unit 511, a set of combinations (corresponding pairs) of the 3D line segment represented by the designated projection line and the designated feature line as a corresponding pair set 535.

The specifying unit 515 may also automatically determine the corresponding pair set 535 using the technique described in Japanese Laid-open Patent Publication No. 2018-55199. According to this technique, a plurality of feature lines satisfying a predetermined condition are extracted from among a plurality of feature lines detected from an image. Next, k corresponding pairs are generated from the extracted feature lines and the remaining 3D line segments from which the hidden lines are removed, and the sum of errors between the position of the projection line of the 3D line segment and the position of the feature line included in each corresponding pair is calculated. Then, while changing the combination of the 3D line segment and the feature line included in the k corresponding pairs, the sum of the errors is repeatedly calculated, and the k corresponding pairs that minimize the sum of the errors are determined as the corresponding pair set 535, FIG. 8 illustrates an example of the corresponding pair set 535. The corresponding pair set 535 of FIG. 8 includes five corresponding pairs, and includes a 3D line segment ID, a 3D line segment starting point, a 3D line segment ending point, a first viewpoint feature line ID, a first viewpoint feature line starting point, and a first viewpoint feature line ending point.

The 3D line segment ID represents identification information of the 3D line segment included in the corresponding pair, the 3D line segment starting point represents the three-dimensional coordinates of one end point of the 3D line segment, and the 3D line segment ending point represents the three-dimensional coordinates of the other end point of the 3D line segment. The first viewpoint feature line ID represents identification information of the feature line included in the corresponding pair, the first viewpoint feature line starting point represents two-dimensional coordinates of one end point of the feature line, and the first viewpoint feature line ending point represents two-dimensional coordinates of the other end point of the feature line. In this example, the unit of the three-dimensional coordinates is mm, and the unit of the two-dimensional coordinates is pixel.

Next, the specifying unit 515 calculates the position and the posture of the imaging device 502 at the first viewpoint using the k corresponding pairs included in the corresponding pair set 535. The specifying unit 515 may calculate a rotation matrix R with three rows and three columns representing a position and a posture and a translation vector T from k corresponding pairs, for example, using the technique described in C. Xu et al., "Pose Estimation from Line Correspondences A Complete Analysis and a Series of Solutions", IEEE Transactions on Pattern Analysis and Machine Intelligence, Vol. 39, No. 6, pp. 1209-1222, June 2017.

The specifying unit 515 generates a projection line by projecting the 3D line segment 534 included in each of the k corresponding pairs onto the image 532 using the calculated position and posture of the imaging device 502. For example, the specifying unit 515 may project the 3D line segment 534 onto the image 532 by the following expression.

$$\begin{pmatrix} u \\ v \\ 1 \end{pmatrix} = A \begin{pmatrix} R & T \\ 0 & 1 \end{pmatrix} \begin{pmatrix} X \\ Y \\ Z \\ 1 \end{pmatrix} \quad (1)$$

Definitions of (X, Y, Z), A, R, T, and (u, v) in the expression (1) are as follows.

(X, Y, Z): three-dimensional coordinates of end point of the 3D line segment
A: internal parameter of imaging device 502
R: rotation matrix with three rows and three columns
T: translation vector
(u, v): two-dimensional coordinates of end point of projection line over the image 532

The internal parameter A of the imaging device 502 may be measured in advance using, for example, the technique described in Z. Zhang, "A Flexible New Technique for Camera Calibration", IEEE Transactions on Pattern Analysis and Machine Intelligence, Vol. 22, No. 11, pp. 1330-1334, November 2000.

Next, the specifying unit 515 calculates an error between the position of the projection line of the 3D line segment 534 included in each corresponding pair and the position of the feature line included in the corresponding pair. The calculated error represents the positional relationship between the projection line and the feature line.

Figure 9:
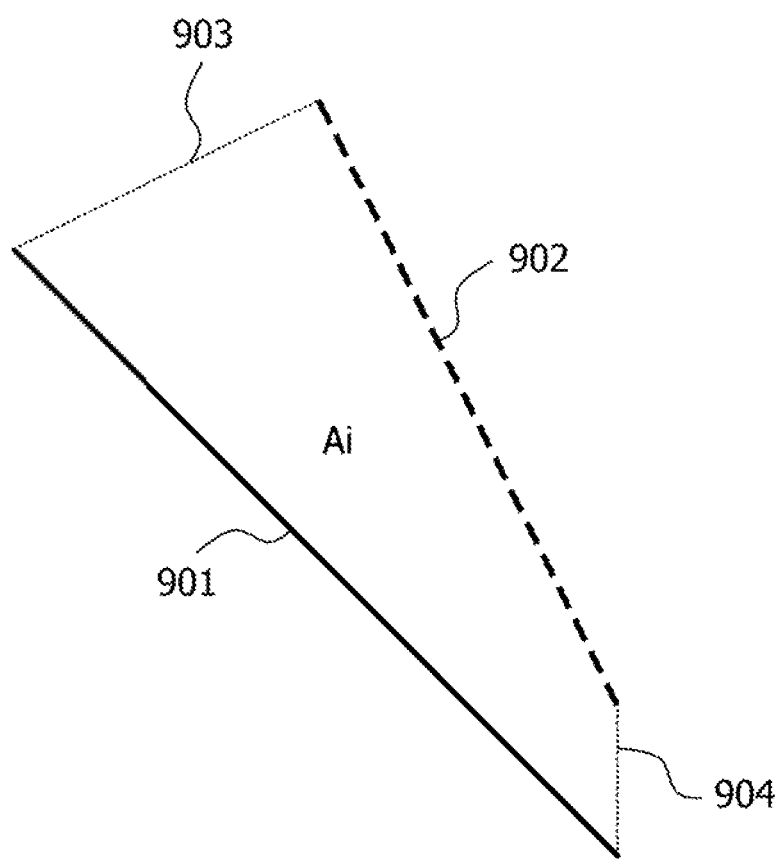
FIG. 9 illustrates a method of calculating an error based on an area.

FIG. 9 illustrates an example of a method of calculating an error based on an area of a region between a projection line and a feature line. When the projection line of the 3D line segment included in the i-th (i=1 to k) corresponding pair of the k corresponding pairs is a line segment 901 and the feature line is a line segment 902, a line segment 903 and a line segment 904 connecting both ends of the line segment 901 and both ends of the line segment 902, respectively, may be defined. In this case, an area Ai of the region surrounded by the line segments 901 to 904 may be used as an error Ei between the position of the projection line and the position of the feature line.

$$Ei=Ai \quad (2)$$

The error Ei becomes smaller as the area Ai become smaller, and the error Ei becomes 0 when the line segment 901 overlaps the line segment 902.

Figure 10:
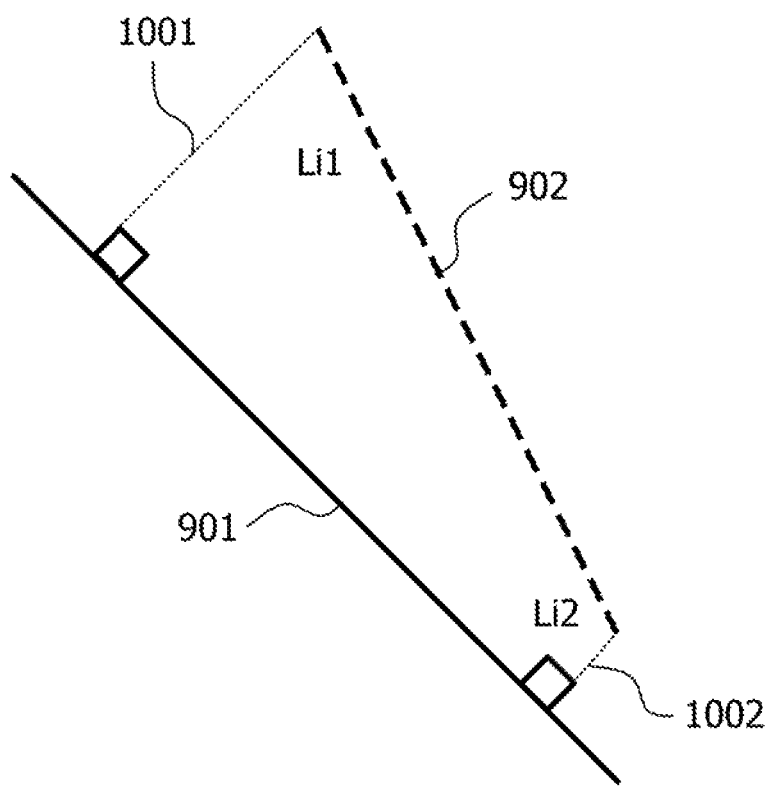
FIG. 10 illustrates a method of calculating an error based on a distance.

FIG. 10 illustrates an example of a method of calculating an error based on a distance between a projection line and a feature line. It is assumed that the lengths of a perpendicular line 1001 and a perpendicular line 1002 that are lowered from both ends of the line segment 902 onto the line segment 901 are defined as Li1 and Li2, respectively. In this case, the sum of Li1 and Li2 may be used as the error Ei.

$$Ei=Li1+Li2 \quad (3)$$

The error Ei becomes smaller as Li1 and Li2 become shorter, and the error Ei becomes 0 when the line segment 901 overlaps the line segment 902.

The specifying unit 515 compares the error Ei with a predetermined threshold value, and when the error Ei is larger than the threshold value, specifies the i-th corresponding pair as a defective portion of the shape of the object.

The specifying unit 515 may also automatically set a threshold value for the error Ei by using the technique described in Japanese Patent Application No, 2018-46251, which is the prior application. According to this technique, the threshold value is set based on a statistical value of an error calculated from each of the k corresponding pairs.

Next, the calculation unit 516 sets a plurality of candidate positions that are candidates for the second viewpoint based on the first viewpoint. The second viewpoint is an example of a second photographing position, and represents a photographing position at which another image is photographed in order to restore a three-dimensional line segment of the object corresponding to the feature line from the feature line included in the corresponding pair specified as the defective portion.

Figure 11:
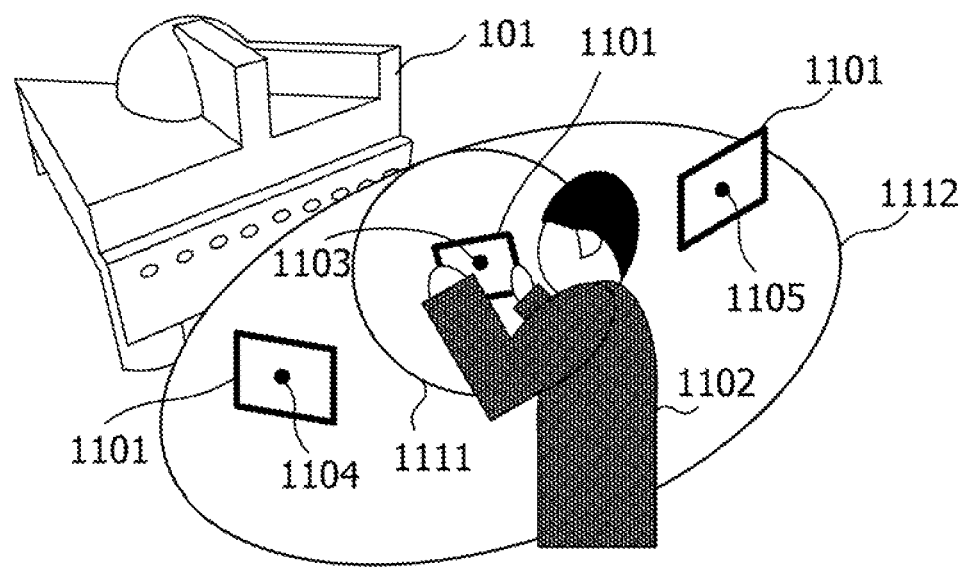
FIG. 11 illustrates candidate positions for a second viewpoint.

FIG. 11 illustrates an example of the candidate position for the second viewpoint. A tablet 1101 is an example of a portable terminal apparatus including the image processing apparatus 501 and the imaging device 502, and a user 1102 uses the tablet 1101 to photograph the object 101 from a position 1103 corresponding to the first viewpoint.

When the second viewpoint is set in a region 1111 close to the position 1103, there is a possibility that a restoration accuracy of a ridgeline which is a three-dimensional line segment over the object is reduced. On the other hand, when the second viewpoint is set outside a region 1112 wider than the region 1111, a moving distance from the position 1103 to the second viewpoint increases and a moving load of the user 1102 increases.

In this case, it is desirable to set a position 1104 or a position 1105 included in the region 1112 but not included in the region 1111 as the second viewpoint. Accordingly, a predetermined number of positions in the region 1112 including the position 1104 and the position 1105 are set as candidate positions.

However, the ridgeline corresponding to the feature line representing the defective portion may not be observed from any of the candidate positions due to self-shielding or the like. Therefore, the calculation unit 516 determines, using each of the predetermined number of candidate positions as viewpoints, whether or not the 3D line segment included in the corresponding pair specified as the defective portion is observed from the viewpoint. This 3D line segment is a specific 3D line segment used to generate the projection line corresponding to the feature line representing the defective portion.

The calculation unit 516 excludes the candidate position used as the viewpoint when the 3D line segment is not observed from the viewpoint, and selects the candidate position used as the viewpoint when the 3D line segment is observed from the viewpoint, thereby extracting a plurality of candidate positions from among a predetermined number of candidate positions. With this configuration, it is possible to extract only the candidate positions where the 3D line segment corresponding to the defective portion may be observed.

Next, the calculation unit 516 calculates an evaluation value 536 for each of the candidate positions based on the distance between the first viewpoint and each of the plurality of candidate positions, and stores the evaluation value 536 in the storing unit 511. The evaluation value 536 of each candidate position represents a restorable degree when restoring the ridgeline representing the defective portion using the candidate position as the second viewpoint. Then, the determination unit 517 determines one of the candidate positions as a recommended position of the second viewpoint based on the evaluation value 536 of each of the plurality of candidate positions.

By calculating the evaluation value 536 of the candidate position based on the distance between the first viewpoint and each candidate position, it is possible to increase the evaluation value 536 of a candidate position existing within a range of an appropriate distance from the first viewpoint and decrease the evaluation value 536 of the other candidate positions. With this configuration, it is possible to determine a candidate position existing within a range of an appropriate distance as the recommended position for the second viewpoint.

Next, the image generation unit 518 generates an object shape image 537 that is observed from the recommended position of the second viewpoint and indicates the shape of the object represented by the CAD data 531 and stores the object shape image 537 in the storing unit 511. Then, the display unit 520 displays the object shape image 537 over the screen. The object shape image 537 is an example of information that enables recognition of the recommended position of the second viewpoint.

Figure 12A:
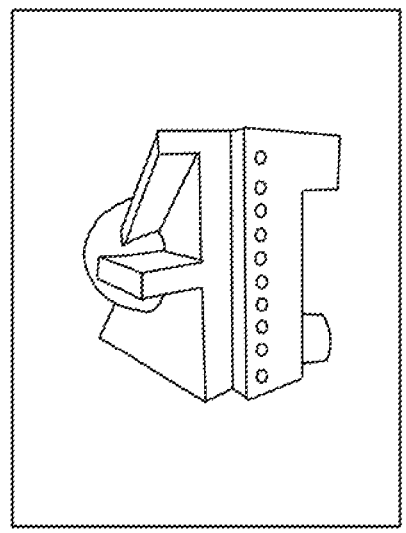
FIGS. 12A and 12B illustrate object shape images.
Figure 12B:
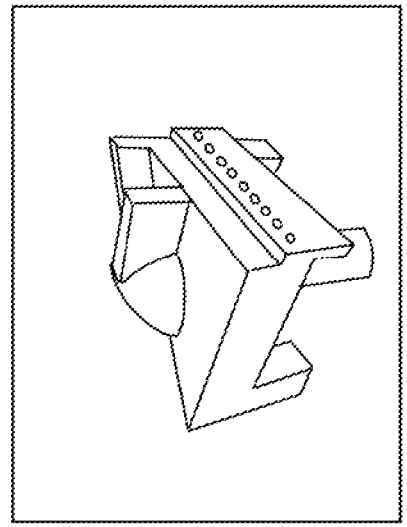

FIGS. 12A and 12B illustrate examples of the object shape image 537. FIG. 12A illustrates an example of the object shape image 537 of the object 101 observed from the position 1104 in FIG. 11, and FIG. 12B illustrates an example of the object shape image 537 of the object 101 observed from the position 1105.

The user moves while holding the portable terminal apparatus including the image processing apparatus 501 and the imaging device 502. At this time, the imaging device 502 photographs an object while moving, the image acquisition unit 512 acquires an image from the imaging device 502, and the display unit 520 displays the acquired image over the screen. Accordingly, an image of the object that changes as the user moves is displayed over the screen. The user moves while comparing the displayed image of the object with the object shape image 537, and stops at a position where the posture of the object reflected in the image coincides with the posture of the object shape image 537, With this configuration, the imaging device 502 moves to the second viewpoint.

The user uses the imaging device 502 to photograph an image 538 of the object from the second viewpoint, and the image acquisition unit 512 acquires the image 538 from the imaging device 502 and stores the image 538 in the storing unit 511. The image 538 is an example of a second image.

The feature line detection unit 513 performs edge detection processing to detect a feature line representing a defective portion from the image 538. The restoration unit 519 restores a ridgeline corresponding to the feature line representing the defective portion detected from the image 532 and the feature line representing the defective portion detected from the image 538 using the feature lines. Next, the restoration unit 519 obtains a three-dimensional deviation amount 539 between the position of the 3D line segment included in the corresponding pair of the defective portion and the position of the restored ridgeline, and stores the three-dimensional deviation amount 539 in the storing unit 511. Then, the display unit 520 displays information indicating the deviation amount 539 over the screen.

By calculating the deviation amount 539 using the restored three-dimensional ridgeline, it is possible to obtain a more accurate deviation amount compared to a method of converting the error between the projection line of the 3D line segment and the feature line in the image into a distance in the three-dimensional space.

According to the image processing apparatus 501 of FIG. 5, when a defective portion of the shape of the object is specified by the image photographed from the first viewpoint, the recommended position of the second viewpoint optimal for restoring the three-dimensional shape of the defective portion is presented. With this configuration, it is possible to estimate the three-dimensional deviation amount with high accuracy while reducing the user's work load.

By restoring only the ridgeline corresponding to the feature line representing the defective portion, the calculation amount for the restoration processing is reduced compared with the case where the entire shape of the object is restored.

Next, an example of a method of setting a candidate position and a method of calculating the evaluation value 536 will be described in more detail with reference to FIGS. 13 to 16. In the following description, an object represented by the CAD data 531 may be described as a 3D model.

Figure 13:
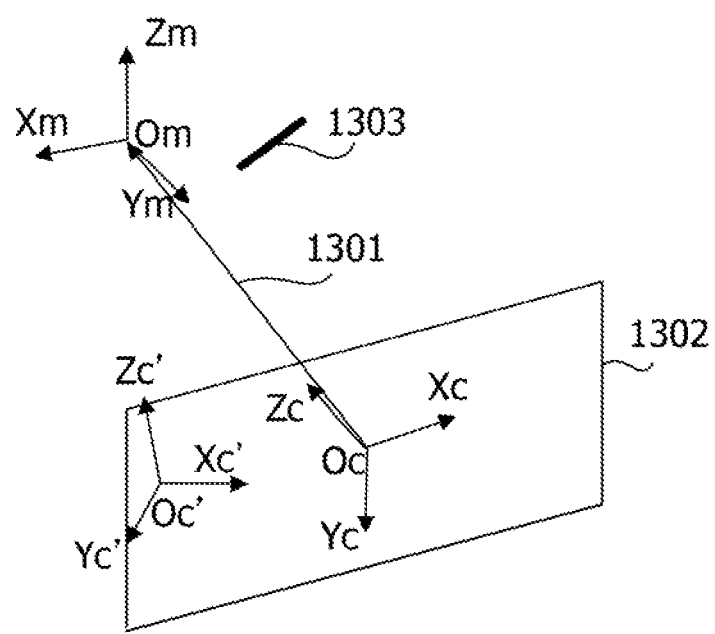
FIG. 13 illustrates a model coordinate system and a camera coordinate system.

FIG. 13 illustrates an example of a model coordinate system having the center of gravity of the 3D model as the origin and a camera coordinate system having the optical center of the imaging device 502 as the origin. The coordinate system Om-XmYmZm represents a model coordinate system having the center of gravity of the 3D model as the origin Om, the coordinate system Oc-XcYcZc represents a camera coordinate system having the first viewpoint as the origin Oc, and the coordinate system Oc'-Xc'Yc'Zc' represents a camera coordinate system having the candidate position of the second viewpoint as the origin Oc'.

The optical axis of the imaging device 502 at the first viewpoint coincides with a straight line 1301 connecting the origin Oc' and the origin Om, and a plane 1302 is a plane perpendicular to the straight line 1301 and passing through the origin Oc. A line segment 1303 represents a 3D line segment included in the corresponding pair of the defective portion.

Figure 14:
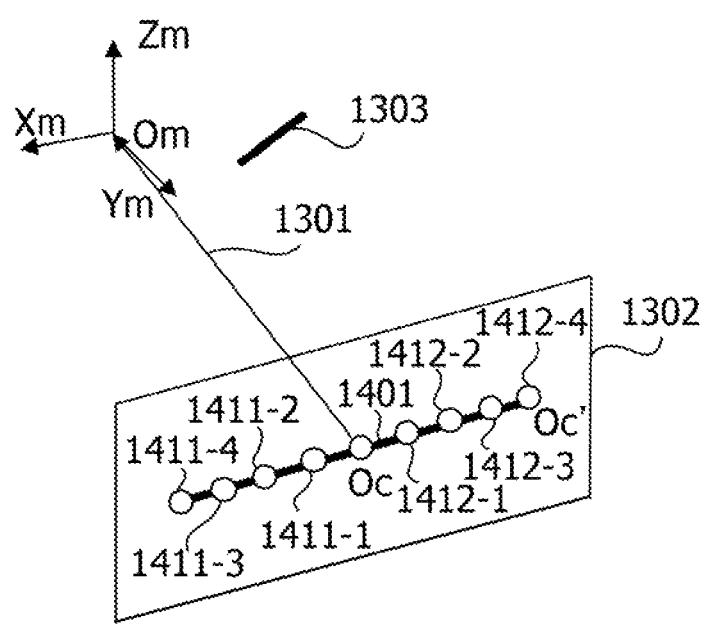
FIG. 14 illustrates a method of setting the candidate positions for the second viewpoint.

FIG. 14 illustrates an example of a method of setting a candidate position for the second viewpoint. In this example, over a straight line 1401 in the plane 1302, candidate positions 1411-1 to 1411-4 and candidate positions 1412-1 to 1412-4 are set at equal intervals. The straight line 1401 is a horizontal line passing through the origin Oc.

When the second viewpoint is set below the straight line 1401, the user performs a squatting motion, and thus the physical load increases. When the second viewpoint is set above the straight line 1401, the user performs an operation of extending the arm, and thus the physical load also increases. Therefore, by setting the second viewpoint over a straight line 1401 passing through the first viewpoint, the physical load on the user is reduced, and the mobility is improved.

The posture of the imaging device 502 at each candidate position over the straight line 1401 is determined such that the optical axis of the imaging device 502 coincides with a straight line connecting the candidate position and the origin Om.

Figure 15:
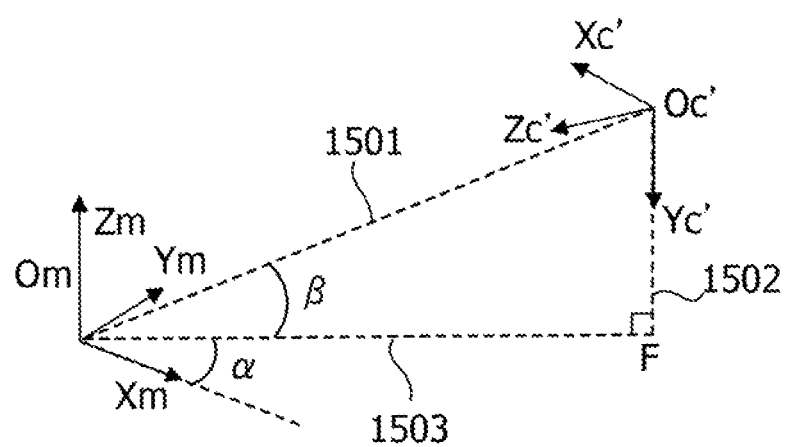
FIG. 15 illustrates an angle between the model coordinate system and the camera coordinate system.

FIG. 15 illustrates an example of an angle between the model coordinate system and the camera coordinate system at each candidate position. A straight line 1501 is a straight line connecting the candidate position and the origin Om, a straight line 1502 is a perpendicular line lowered over an XmYm plane from the origin Oc', and a point F is an intersecting point of the straight line 1502 and the XmYm plane. The angle $\alpha$ is an angle formed by a straight line 1503 connecting the origin Om and the point F and the Xm axis, and the angle $\beta$ is an angle formed by the straight line 1501 and the straight line 1503. At this time, the posture of the imaging device 502 at each candidate position is represented by the rotation matrix R' of the following expression.

$$R' = R1 R2 R3 R4 \qquad (4)$$

$$R1 = \begin{pmatrix} \cos\alpha & -\sin\alpha & 0 \\ \sin\alpha & \cos\alpha & 0 \\ 0 & 0 & 1 \end{pmatrix} \qquad (5)$$

$$R2 = \begin{pmatrix} \cos\beta & 0 & -\sin\beta \\ 0 & 1 & 0 \\ \sin\beta & 0 & \cos\beta \end{pmatrix} \qquad (6)$$

$$R3 = \begin{pmatrix} 1 & 0 & 0 \\ 0 & 0 & 1 \\ 0 & -1 & 0 \end{pmatrix} \quad (7)$$

$$R4 = \begin{pmatrix} 0 & 0 & -1 \\ 0 & 1 & 0 \\ 1 & 0 & 0 \end{pmatrix} \quad (8)$$

R1 is a rotation matrix representing rotation of the angle α about the Zm axis, and R2 is a rotation matrix representing rotation of the angle β around the Ym axis. R3 is a rotation matrix representing −90 degree rotation around the Xm axis, and R4 is a rotation matrix representing −90 degree rotation around the Ym axis.

The calculation unit 516 determines whether or not the line segment 1303 becomes the hidden line when an object is observed from the candidate position using the posture of the imaging device 502 at each candidate position. The calculation unit 516 may perform the hidden line determination using the technique of L. G. Roberts, "Machine perception of three dimensional solids", MIT Lincoln Lab. Rep., TR3315, pp. 1-82, May 1963, for example. Then, when the line segment 1303 becomes the hidden line, the calculation unit 516 excludes the candidate position and calculates an evaluation value 536 for the remaining candidate positions. M the evaluation value 536, for example, an evaluation value Q of the following expression may be used.

$$Q = L^2 e^{-a|L|} \quad (9)$$

$$a = 2/(d \tan(\theta 1)) \quad (10)$$

L in the expression (9) represents a signed distance between each candidate position over the straight line 1401 and the origin Oc. For example, L for the candidate positions 1411-1 to 1411-4 has a positive sign, and L for the candidate positions 1412-1 to 1412-4 has a negative sign. In the expression (10), d represents the distance between the origin Om and the origin Oc, and θ1 is a prescribed value representing the angle formed by the straight line 1301 and the straight line 1501. As θ1, the most preferable angle for restoring the ridgeline of the object may be used, or θ1 may be increased or decreased according to the object to be photographed. θ1 may be an angle in the range of 15° to 25°.

Figure 16:
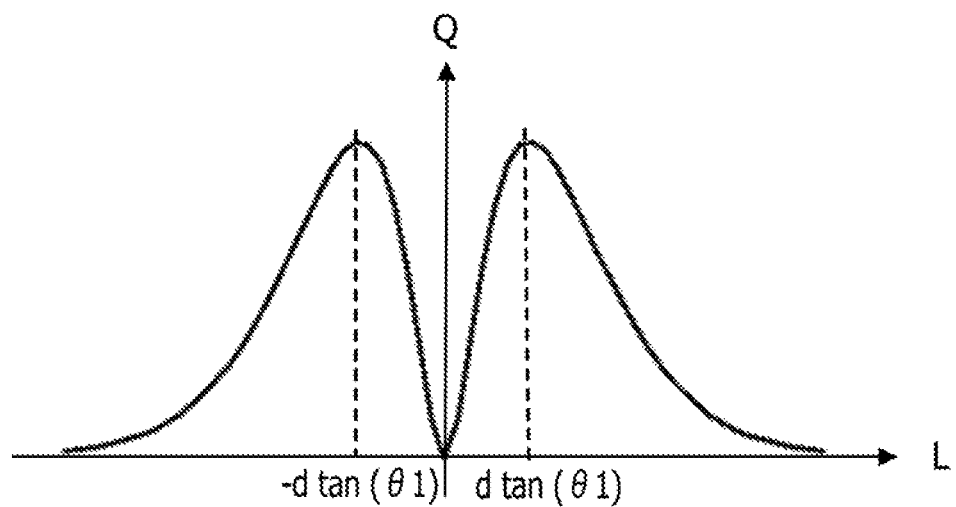
FIG. 16 illustrates a function form of an evaluation value Q.

FIG. 16 illustrates an example of a function form of the evaluation value Q. The horizontal axis represents the signed distance L, and the vertical axis represents the evaluation value Q. When L=0, Q=0, Q increases as |L| moves away from 0, and when |L|=d tan(θ1), Q becomes the maximum. Then, Q gradually decreases as |L| departs from d tan(θ1).

The determination unit 517 selects one or a plurality of candidate positions in descending order of the evaluation value Q among the plurality of candidate positions, and determines the selected candidate position as a recommended position of the second viewpoint.

As described above, the recommended position of the second viewpoint is determined using the evaluation value Q that becomes the maximum when |L| is a predetermined value, thereby capable of separating the first viewpoint and the second viewpoint by a certain distance or more and improving the accuracy of triangulation. Since the first viewpoint and the second viewpoint are not too far apart, the moving load on the user is reduced, and the influence of environmental light and the like is reduced.

Figure 17:
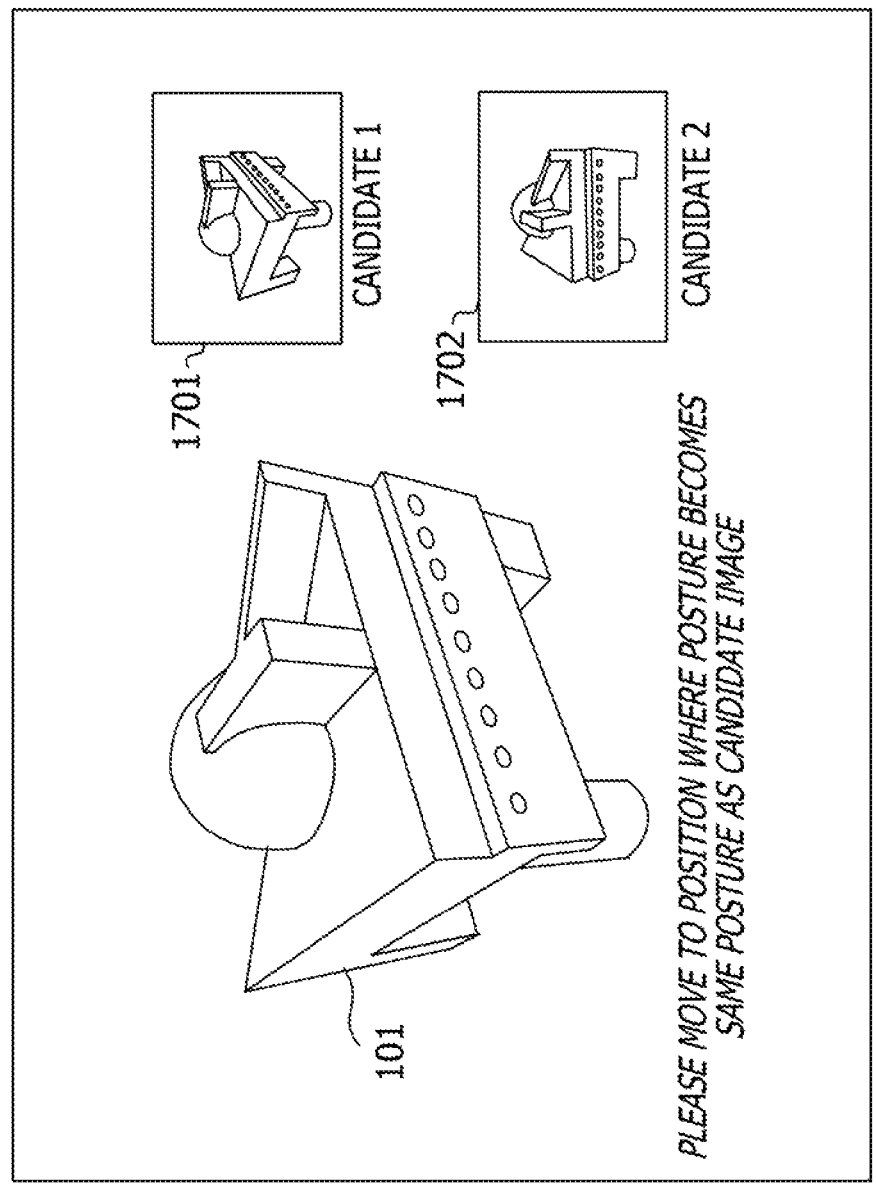
FIG. 17 illustrates an image and an object shape image at a first viewpoint.

FIG. 17 illustrates an example of the object shape image 537 displayed over the screen together with the image 532 at the first viewpoint. An object shape image 1701 of "candidate 1" represents the 3D model observed from the recommended position having the largest evaluation value Q and an object shape image 1702 of "candidate 2" represents the 3D model observed from the recommended position having the second largest evaluation value Q. Below the object 101 observed from the first viewpoint, a message "Please move to the position where the posture becomes the same posture as the candidate figure." is displayed.

According to the displayed message, the user moves to a position where the posture of the object 101 coincides with the posture of the object shape image 1701 or 1702. The imaging device 502 photographs the object 101 from that position, and the image acquisition unit 512 stores the photographed image in the storing unit 511 as the image 538 at the second viewpoint.

The image processing apparatus 501 performs the same processing as the image 532 on the image 538, detects a feature line from the image 538, generates a corresponding pair set, and calculates the position and posture of the imaging device 502 at the second viewpoint using the k corresponding pairs included in the corresponding pair set.

Next, the restoration unit 519 projects the 3D line segment included each of the k corresponding pairs onto the image 538 using the calculated position and posture of the imaging device 502, thereby generating a projection line at the second viewpoint. Then, the restoration unit 519 selects the projection line at the second viewpoint of the 3D line segment included in the corresponding pair of the defective portion, and specifies a feature line closest to the selected projection line among the feature lines detected from the image 538. With this configuration, the 3D line segment of the defective portion is associated with the feature line in image 538 at the second viewpoint.

FIG. 18 illustrates an example of a corresponding pair set obtained by adding the feature line in the image 538 at the second viewpoint to the corresponding pair set 535 of FIG. 8. The corresponding pair set of FIG. 18 has a configuration in which a flag, a second viewpoint feature line ID, a second viewpoint feature line starting point, and a second viewpoint feature line ending point are added to the corresponding pair set 535 of FIG. 8.

The flag indicates whether or not the corresponding pair of the 3D line segment and the first viewpoint feature line is a defective portion. "True" indicates the corresponding pair is the defective portion, and "False" indicates that the corresponding pair is not the defective portion. The second viewpoint feature line ID represents identification information of the feature line at the second viewpoint, which is associated with the 3D line segment of the defective portion. The second viewpoint feature line starting point represents the two-dimensional coordinates of one end point of the feature line at the second viewpoint, and the second viewpoint feature line ending point represents the two-dimensional coordinates of the other end point of the feature line at the second viewpoint.

In this example, two 3D line segments of 3D line segment ID "1" and 3D line segment ID "4" are specified as defective portions. The 3D line segment ID "1" is associated with the feature line of the first viewpoint feature line ID "43" and the feature line of the second viewpoint feature line ID "16". The 3D line segment ID "4" is associated with the feature line of the first viewpoint feature line ID "47" and the feature line of the second viewpoint feature line ID "53".

The restoration unit 519 performs the restoration processing illustrated in FIG. 2 using the feature line at the first viewpoint and the feature line at the second viewpoint, which are associated with the 3D line segment of the defective portion, thereby restoring the ridgeline corresponding to those feature lines. In this case, the first viewpoint and the second viewpoint are used as the viewpoint O1 and the viewpoint O2, respectively, and the image planes of the image 532 and the image 538 are used as the image plane 211 and the image plane 212, respectively.

When the feature line 221 and the feature line 222 are specified, the ridgeline 201 corresponding to those feature lines is determined as an intersecting line between a plane n1 passing through the viewpoint O1, the point p1s, and the point pie and a plane n2 passing through the viewpoint O2, the point pts, and the point p2e. For example, the equations of the plane n1 and the plane n2 are expressed by the following expressions using a vector x representing three-dimensional coordinates.

$$n1(n1,x)+d1=0 \quad (11)$$

$$n2(n2,x)+d2=0 \quad (12)$$

n1 represents a normal vector of the plane n1, n2 represents a normal vector of the plane n2, and (v1, v2) represents an inner product of the vector v1 and the vector v2. d1 and d2 are constants. At this time, the equations of the intersecting line of the plane n1 and the plane n2 are expressed by the following expressions using the parameter t.

$$x = p0 + tu0 \quad (13)$$

$$p0 = \frac{((n1, n2)d2 - |n2|^2 d1)n1 + ((n1, n2)d1 - |n1|^2 d2)n2}{|n1 \times n2|^2} \quad (14)$$

$$u0 = \frac{n1 \times n2}{|n1 \times n2|^2} \quad (15)$$

p0 is a vector representing a point over the intersecting line, and u0 is a direction vector of the intersecting line. n1×n2 represents the outer product of the normal vector n1 and the normal vector n2.

The restoration unit 519 specifies, as the ridgeline 201, a line segment having the point Ps and the point Pe over the straight line represented by the expression (13) as both end points. Then, the restoration unit 519 calculates a three-dimensional deviation amount 539 between the position of the 3D line segment of the defective portion and the position of the ridgeline 201.

Figure 19:
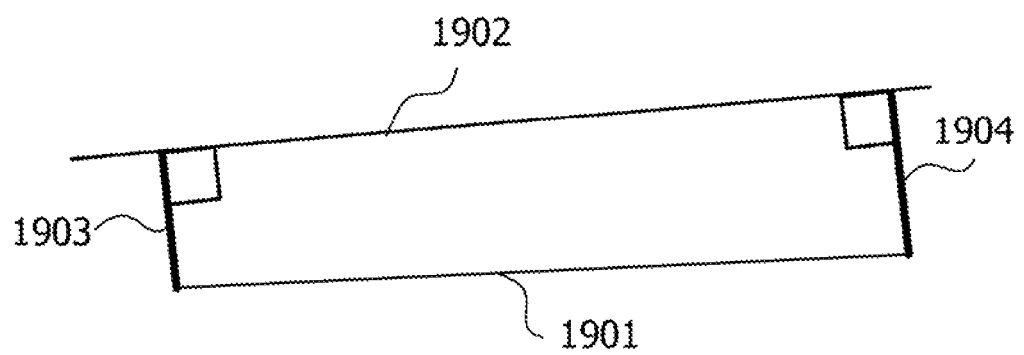
FIG. 19 illustrates a method of calculating a deviation amount.

FIG. 19 illustrates an example of a method of calculating the deviation amount 539. The restoration unit 519 calculates the lengths of the perpendicular lines 1903 and 1904, which are lowered onto the restored ridgeline 1902 from both ends of the 3D line segment 1901 of the defective portion, and determines the longer one as the deviation amount 539.

FIG. 20 illustrates an example of the corresponding pair set obtained by adding the calculated deviation amount 539 to the corresponding pair set of FIG. 18. In this example, the deviation amount 539 of the ridgeline with respect to the 3D line segment of the 3D line segment ID "1" is 13.1 mm, and the deviation amount 539 of the ridgeline with respect to the 3D line segment of the 3D line segment ID "4" is 19.2 mm.

The image processing apparatus 501 may display only the object shape image 537 observed from the recommended position having the largest evaluation value 536 instead of simultaneously displaying the object shape image 537 observed from the plurality of recommended positions of the second viewpoint. Then, when the feature line corresponding to the 3D line segment of the defective portion is not detected from the image 538 photographed at the recommended position due to the influence of shadow or the like, the image processing apparatus 501 displays the object shape image 537 observed from the recommended position having the second largest evaluation value 536. In this case, the user may not determine which of the plurality of object shape images 537 displayed over the screen is appropriate.

Figure 21:
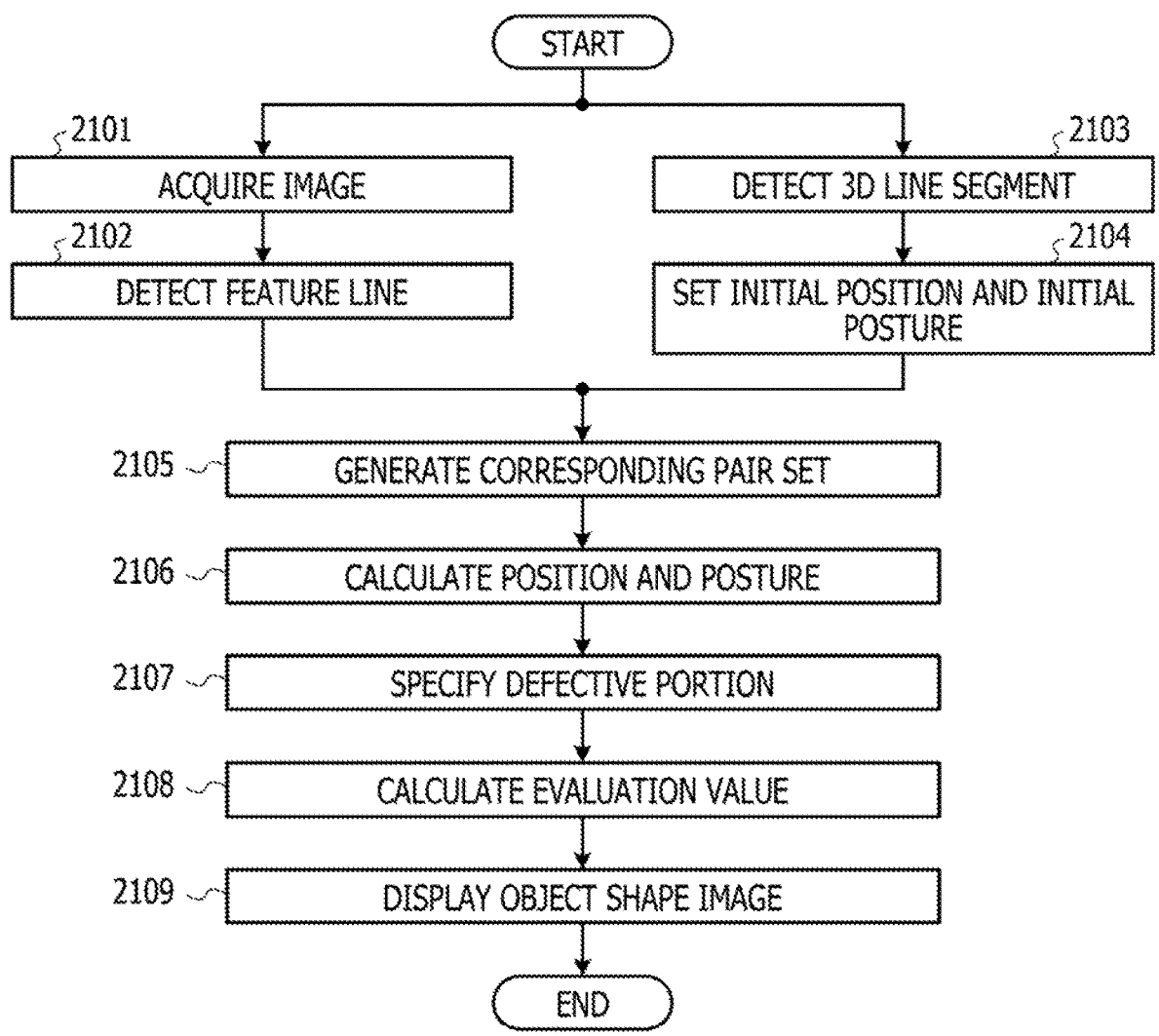
FIG. 21 is a flowchart of image processing at a first viewpoint.

FIG. 21 is a flowchart illustrating an example of image processing performed at the first viewpoint by the image processing apparatus 501 in FIG. 5. First, the image acquisition unit 512 acquires the image 532 at the first viewpoint from the imaging device 502 (step 2101), and the feature line detection unit 513 detects a plurality of feature lines 533 from the image 532 (step 2102).

The line segment detection unit 514 detects a plurality of 3D line segments 534 from the CAD data 531 (step 2103), and the specifying unit 515 sets an initial position and an initial posture of the imaging device 502 (step 2104).

Next, the specifying unit 515 removes hidden lines from the 3D line segments 534, generates the corresponding pair set 535 from the remaining 3D line segments (step 2105), and calculates the position and the posture of the imaging device 502 at the first viewpoint using the corresponding pair set 535 (step 2106).

Next, the specifying unit 515 projects the 3D line segment 534 included in the corresponding pair set 535 onto the image 532 using the calculated position and posture of the imaging device 502, thereby generating the projection line at the first viewpoint. Then, the specifying unit 515 compares the error between the position of the projection line of the 3D line segment 534 and the position of the feature line with a threshold value to specify the defective portion of the shape of the object (step 2107).

Next, the calculation unit 516 sets a plurality of candidate positions that are candidates for the second viewpoint, and calculates the evaluation value 536 of each candidate position (step 2108). Next, the determination unit 517 determines the recommended position of the second viewpoint based on the evaluation value 536, the image generation unit 518 generates the object shape image 537 observed from the recommended position, and the display unit 520 displays the object shape image 537 together with image 532 over the screen (step 2109).

Figure 22:
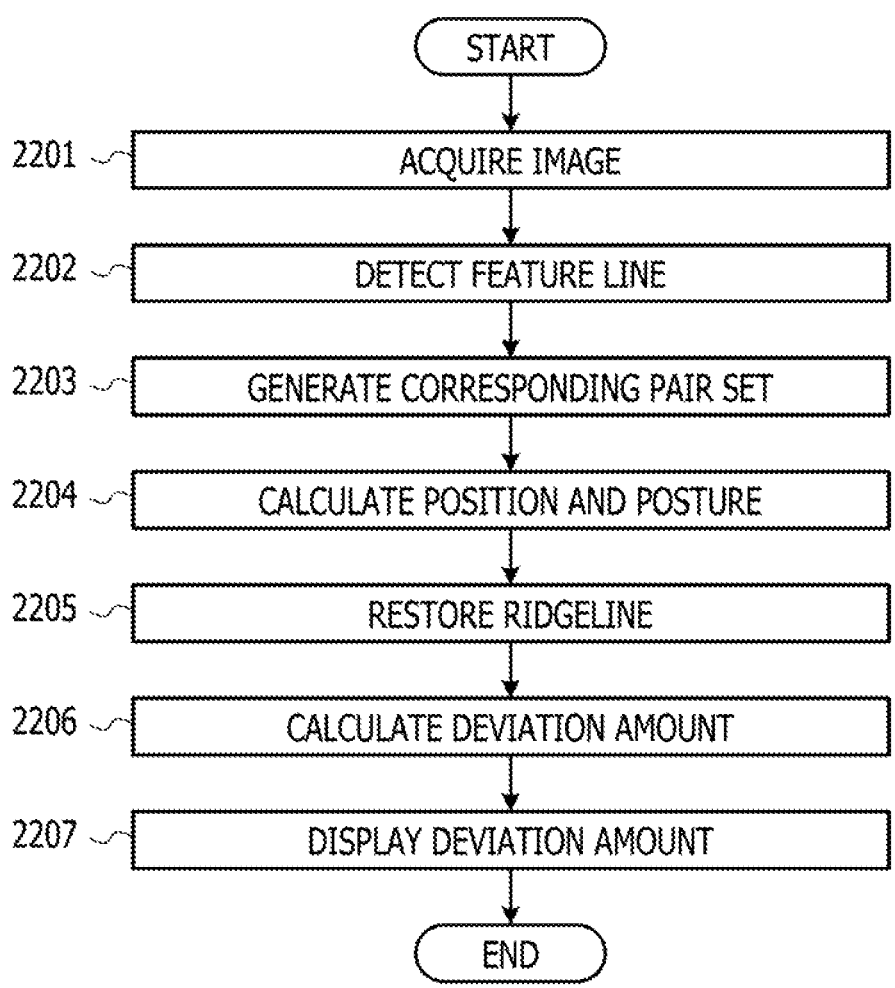
FIG. 22 is a flowchart of image processing at a second viewpoint.

FIG. 22 is a flowchart illustrating an example of image processing performed at the second viewpoint by the image processing apparatus 501 in FIG. 5. First, the image acquisition unit 512 acquires the image 538 at the second viewpoint from the imaging device 502 (step 2201), and the feature line detection unit 513 detects a plurality of feature lines from the image 538 (step 2202).

Next, the specifying unit 515 removes the hidden line from the 3D line segment, generates a corresponding pair set from the remaining 3D line segments (step 2203), and calculates the position and the posture of the imaging device 502 at the second viewpoint using the corresponding pair set (step 2204).

Next, the restoration unit 519 generates a projection line at the second viewpoint by projecting the 3D line segment included in the corresponding pair set onto the image 538 using the calculated position and posture of the imaging device 502. Then, the restoration unit 519 specifies the feature line in the image 538 corresponding to the 3D line segment of the defective portion using the projection line in the second viewpoint, and restores the ridgeline using the feature line in the image 532 and the feature line in the image 538 corresponding to the 3D line segment of the defective portion (step 2205).

Next, the restoration unit 519 calculates the deviation amount 539 between the position of the 3D line segment of the defective portion and the position of the restored ridgeline (step 2206), and the display unit 520 displays information indicating the deviation amount 539 over the screen (step 2207).

Meanwhile, the determination unit 517 may also determine a third viewpoint for photographing an evidence image of the defective portion based on the 3D line segment of the defective portion and the restored ridgeline. The third viewpoint is an example of a third photographing position.

For example, when the deviation amount 539 is displayed together with a plurality of defective portions over the screen, the user selects any of the defective portions as a processing target, and the determination unit 517 determines the position where the deviation amount 539 of the selected defective portion is observed to be the largest as the recommended position of the third viewpoint. In this case, the recommended position of the third viewpoint exists over a straight line perpendicular to the direction in which the restored ridgeline is deviated.

The image generation unit 518 generates an object shape image observed from the recommended position of the third viewpoint, and the display unit 520 displays the object shape image over the screen together with the image 538. The object shape image observed from the recommended position of the third viewpoint is an example of information that enables recognition of the recommended position of the third viewpoint.

Figure 23:
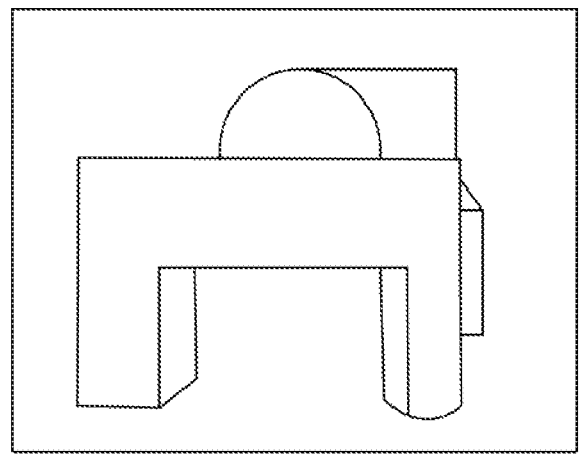
FIG. 23 illustrates an object shape image observed from a recommended position for a third viewpoint.

FIG. 23 illustrates an example of the object shape image observed from the recommended position for the third viewpoint. The object shape image in FIG. 23 represents an image in which the largest deviation amount between the protrusion 111 of the object 101 and the 3D line segment of the CAD data 102 illustrated in FIG. 1 is observed.

Figure 24:
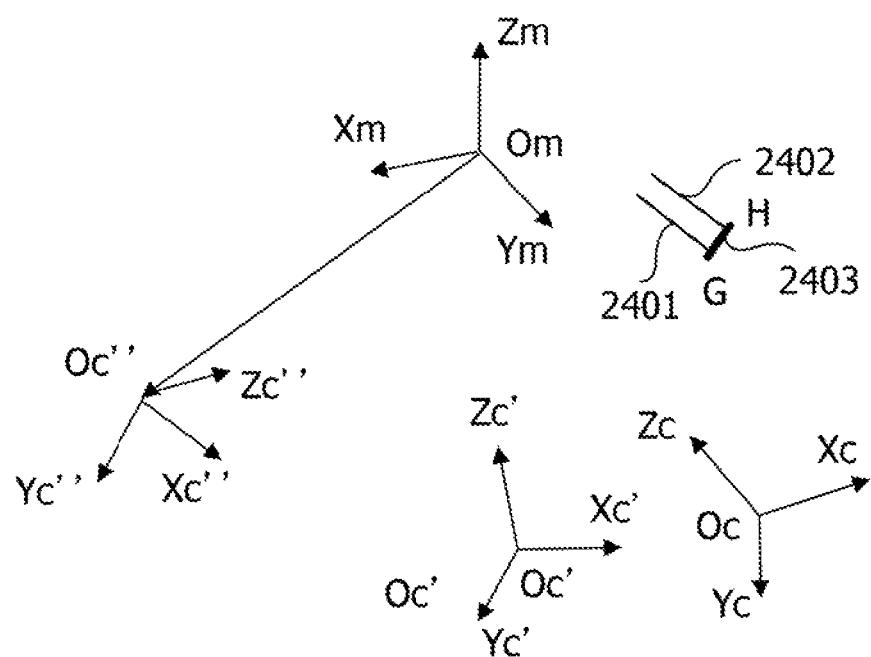
FIG. 24 illustrates a camera coordinate system at a third viewpoint.

FIG. 24 illustrates an example of the camera coordinate system at the third viewpoint. The coordinate system Om-XmYmZm represents a model coordinate system, the coordinate system Oc-XcYcZc represents a camera coordinate system having the first viewpoint as the origin Oc, and the coordinate system Oc'-Xc'Yc'Zc' represents a camera coordinate system having the candidate position of the second viewpoint as the origin Oc'. The coordinate system Oc"-Xc"Yc"Zc" represents a camera coordinate system having the recommended position of the third viewpoint as the origin Oc".

A point G represents an end point of a 3D line segment 2401 of the defective portion, and a point H represents a foot of a perpendicular line 2403 which is lowered from the point G with respect to the restored ridgeline 2402. Over a straight line connecting the origin Om and the origin Oc", a direction vector directing from the origin Om to the origin Oc" is r and the direction vector of the 3D line segment 2401 is q1, and a direction vector directing from the point G to the point H is q2.

At this time, the determination unit 517 determines the position of the origin Oc" such that $r = q2 \times q1$, and the distance between the origin Om and the origin Oc" is equal to the distance between the origin Om and the origin Oc. Then, the determination unit 517 determines the posture of the imaging device 502 at the recommended position of the third viewpoint using the same rotation matrix as in the expression (4).

Figure 25:
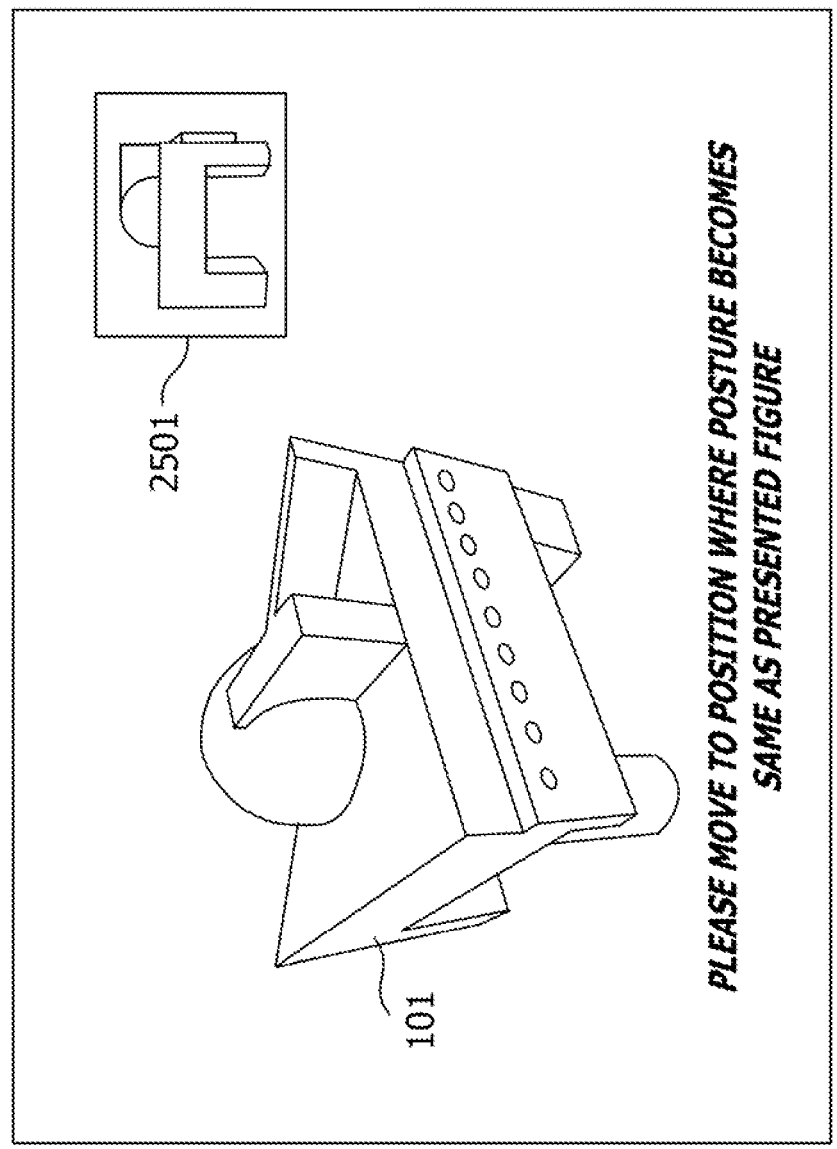
FIG. 25 illustrates an image and an object shape image at the second viewpoint.

FIG. 25 illustrates an example of the object shape image displayed over the screen together with the image 538 at the second viewpoint. An object shape image 2501 represents the 3D model observed from the recommended position of the third viewpoint, and below the object 101, a message "Please move to the position where the posture becomes the same posture as the presented figure." is displayed.

The user moves to the position where the posture of the object 101 coincides with the posture of the object shape image 2501 according to the displayed message. The imaging device 502 photographs the object 101 from that position, and the image acquisition unit 512 stores the photographed image in the storing unit 511 as the evidence image of the defective portion. With this configuration, an image that clearly indicates the deviation amount 539 may be recorded as an evidence image.

Figure 26:
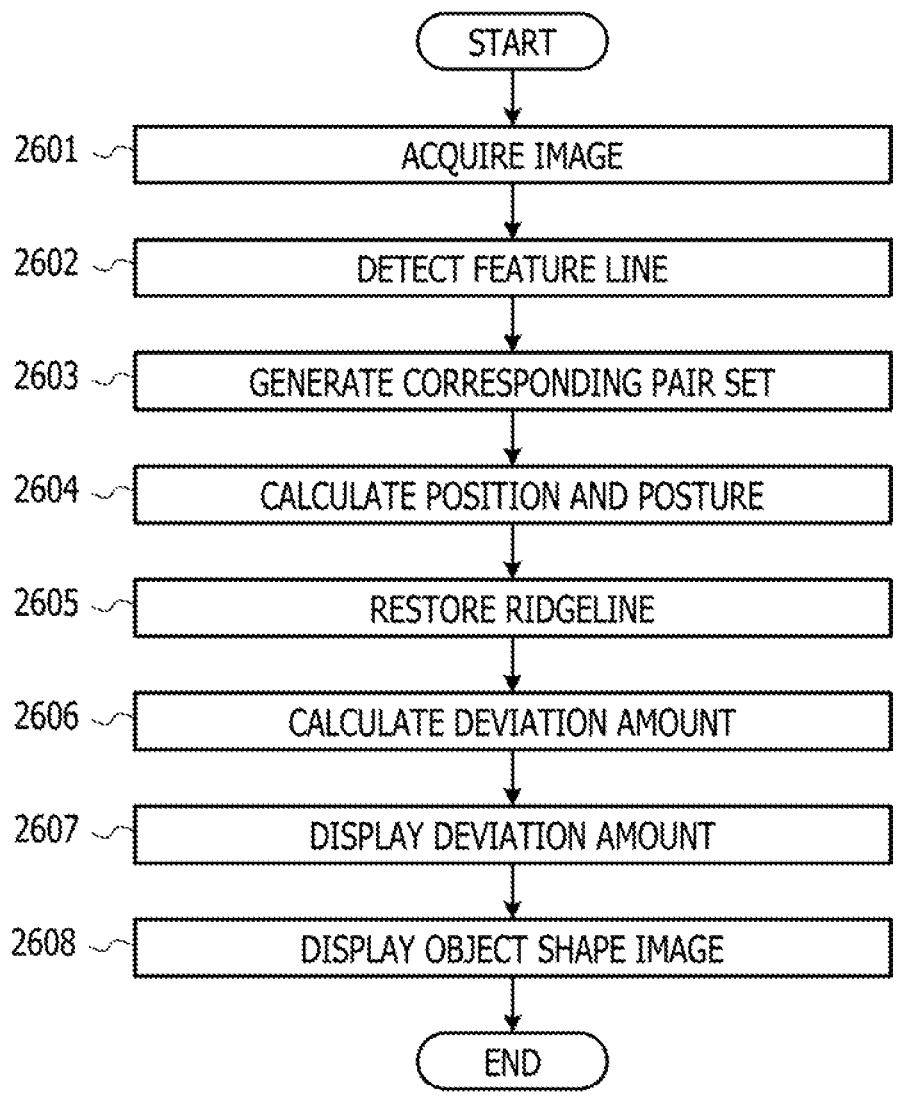
FIG. 26 is a flowchart of image processing for presenting the third viewpoint to a user.

FIG. 26 is a flowchart illustrating an example of image processing for presenting a recommended position of the third viewpoint to the user at the second viewpoint. The processing in steps 2601 to 2607 is the same as the processing in steps 2201 to 2207 in FIG. 22. After the information indicating the deviation amount 539 is displayed, the determination unit 517 determines the recommended position of the third viewpoint, the image generation unit 518 generates an object shape image observed from the recommended position, and the display unit 520 displays the object shape image over the screen together with the image 538 (step 2608).

Figure 27:
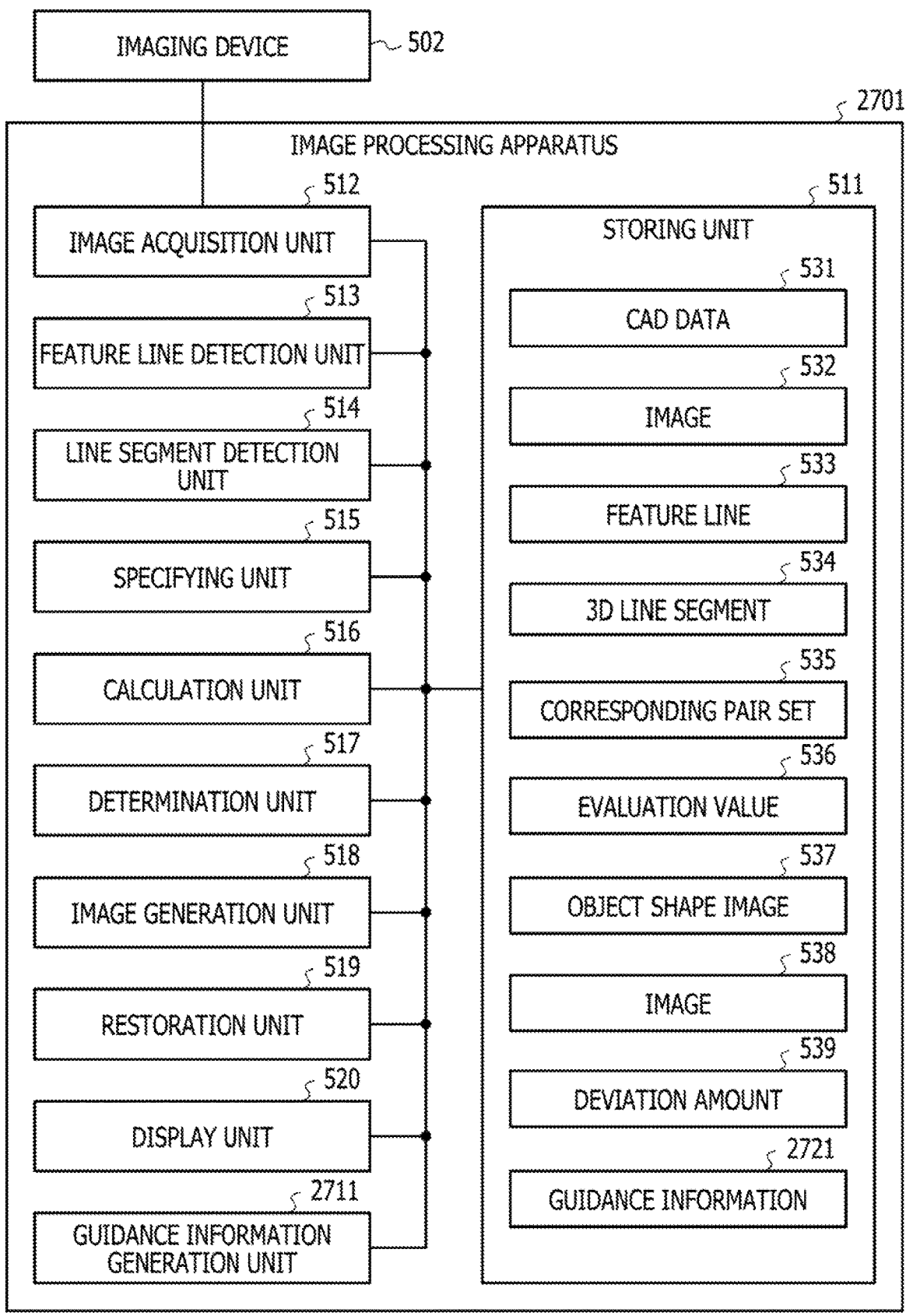
FIG. 27 is a functional configuration diagram illustrating a second specific example of the image processing apparatus.

FIG. 27 illustrates a second specific example of the image processing apparatus 301 in FIG. 3. An image processing apparatus 2701 in FIG. 27 has a configuration obtained by adding a guidance information generation unit 2711 to the image processing apparatus 501 in FIG. 5.

The guidance information generation unit 2711 generates guidance information 2721 for guiding the user holding the portable terminal apparatus including the image processing apparatus 2701 and the imaging device 502 from the first viewpoint to the second viewpoint, and stores the guidance information 2721 in the storing unit 511. The guidance information 2721 is content information indicating a moving method from the first viewpoint to the second viewpoint. The display unit 520 displays the guidance information 2721 over the screen together with the image 532 and the object shape image 537.

Figure 28:
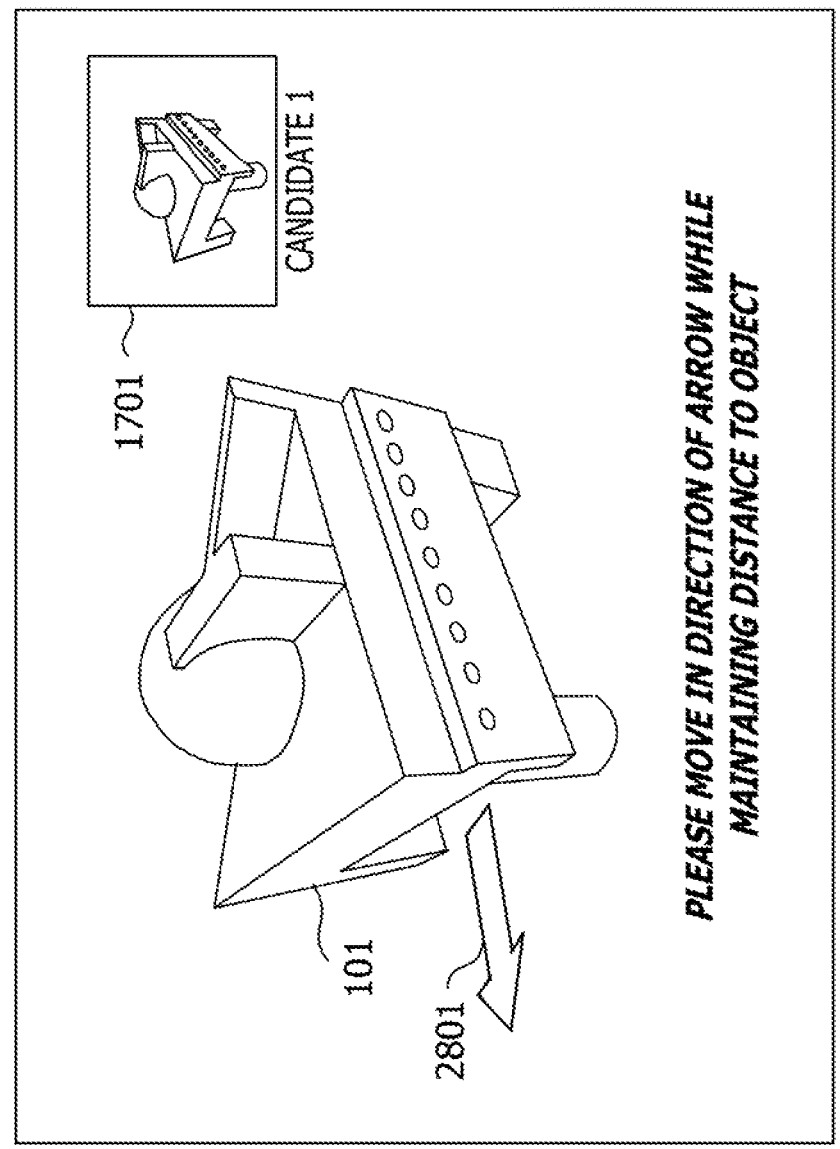
FIG. 28 illustrates guidance information.

FIG. 28 illustrates an example of the guidance information 2721 displayed over the screen together with the object shape image 1701 of FIG. 17. In this example, an arrow 2801 indicating the moving direction of the user is displayed as the guidance information 2721, and a message "Please move in the direction of the arrow while maintaining the distance to the object" is displayed below the object 101.

For example, the image acquisition unit 512 acquires an image from the imaging device 502 at predetermined time intervals, and the feature line detection unit 513 detects a plurality of feature lines from the image. In the following description, an image at each time acquired from the imaging device 502 may be referred to as a frame.

The specifying unit 515 generates a corresponding pair set using the feature line detected from each frame, and calculates the position and the posture of the imaging device 502 using the corresponding pair set. First, the specifying unit 515 projects the 3D line segment of the corresponding pair set in the immediately preceding frame onto the image using the position and the posture of the imaging device 502 calculated for the immediately preceding frame, thereby forming a projection line.

Next, the specifying unit 515 associates the feature line closest to the projection line of each 3D line segment among the feature lines detected from the current frame with the 3D line segment, thereby generating the corresponding pair set in the current frame. With this configuration, the feature line may be tracked between the preceding and next frames. Then, the specifying unit 515 calculates the position and the posture of the imaging device 502 with respect to the current frame using the generated corresponding pair set.

Next, the guidance information generation unit 2711 projects the first viewpoint and the recommended position of the second viewpoint onto the image using the position and the posture of the imaging device 502 with respect to the current frame, and generates an arrow directing from the projection point of the first viewpoint to the projection point of the recommended position of the second viewpoint. However, the size of the arrow is adjusted to fit within the screen.

By displaying the guidance information 2721 over the screen, the user may intuitively recognize the moving direction, and the convenience of the user is improved. Content information such as graphics and illustrations other than arrows may be used as the guidance information 2721.

Figure 29:
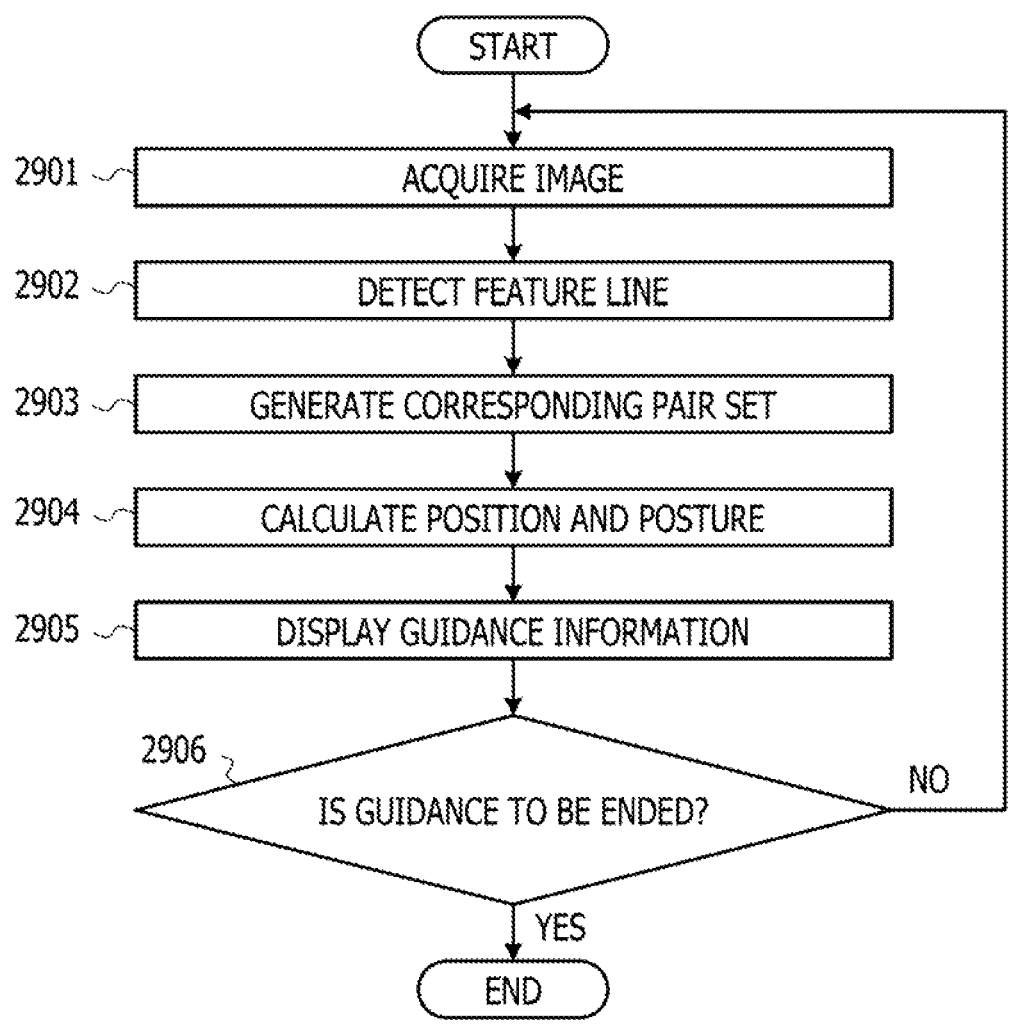
FIG. 29 is a flowchart of image processing for displaying guidance information.

FIG. 29 is a flowchart illustrating an example of image processing for displaying the guidance information 2721 while the user is moving after the image processing in FIG. 21 ends. First, the image acquisition unit 512 acquires an image of the current frame from the imaging device 502 (step 2901), and the feature line detection unit 513 detects a plurality of feature lines from the image (step 2902).

Next, the specifying unit 515 traces the feature line between the preceding and next frames and generates a corresponding pair set in the current frame (step 2903), and calculates the position and the posture of the imaging device 502 with respect to the current frame using the corresponding pair set (step 2904).

Next, the guidance information generation unit 2711 generates the guidance information 2721, and the display unit 520 displays the guidance information 2721 over the screen together with the image of the current frame and the object shape image 537 (step 2905).

Next, the guidance information generation unit 2711 determines whether or not to end guidance for the user (step 2906). For example, the guidance information generation unit 2711 determines that the guidance is to be ended when the user moves to the recommended position of the second viewpoint. The guidance information generation unit 2711 may determine that the guidance is to be ended when an operation input such as a tap from the user is received.

When it is determined that the guidance is not to be ended (NO in step 2906), the image processing apparatus 2701 repeats processing from step 2901 and subsequent steps for the next frame. On the other hand, when it is determined that the guidance is to be ended (YES in step 2906), the image processing apparatus 2701 ends the image processing of FIG. 29 and starts the image processing of FIG. 22 or FIG. 26.

In step 2905, the calculation unit 516 calculates the evaluation value 536 of the position of the imaging device 502 with respect to the current frame, and the display unit 520 may display the calculated evaluation value 536 over the screen. At this time, the display unit 520 may display the evaluation value 536 using a different color according to the size of the evaluation value 536. With this configuration, the evaluation value 536 that changes for each frame is presented to the user in real time.

The configurations of the image processing apparatuses in FIGS. 3, 5, and 27 are merely examples, and some components may be omitted or changed according to the use or conditions of the image processing apparatus. For example, when information other than the object shape image 537 is used as information that enables recognition of the recommended position of the second viewpoint in the image processing apparatuses of FIGS. 5 and 27, the image generation unit 518 may be omitted. When the restoration processing for restoring the ridgeline and the calculation of the deviation amount 539 are performed by an external apparatus, the restoration unit 519 may be omitted. Instead of the CAD data 531, other shape information representing the shape of the object may be used.

The flowcharts in FIGS. 4, 21, 22, 26, and 29 are merely examples, and some of processing steps may be omitted or changed according to the configuration or conditions of the image processing apparatus. For example, in step 2109 in FIG. 21 and step 2608 in FIG. 26, the display unit 520 may display information other than the object shape image over the screen. When the restoration processing for restoring the ridgeline and the calculation of the deviation amount 539 are performed by an external apparatus, the processing of steps 2202 to 2207 in FIG. 22 may be omitted.

The images in FIG. 1, FIG. 17, FIG. 25, and FIG. 28 are merely examples, and the image of the object changes according to an object to be photographed. The ridgeline and image plane in FIG. 2, the CAD data in FIG. 6, the 3D line segment and the feature line in FIG. 7 are merely examples, and the ridgeline, the image plane, the CAD data, the 3D line segment, and the feature line change according to the object to be photographed, and the configuration or conditions of the image processing apparatus. The corresponding pair set in FIGS. 8, 18, and 20 are merely examples, and the corresponding pair sets change according to the object to be photographed, and the configuration or conditions of the image processing apparatus.

The methods of calculating the error in FIGS. 9 and 10 are mere examples, and another calculation method may be used according to the configuration or conditions of the image processing apparatus. The candidate positions in FIGS. 11 and 14 are merely examples, and another candidate position may be set according to the object to be photographed. The object shape images in FIG. 12, FIG. 17, FIG. 23, FIG. 25, and FIG. 28 are merely examples, and the object shape images change according to the object to be photographed.

The coordinate systems in FIGS. 13 to 15 and 24 are merely examples, and another coordinate system may be used according to the configuration or conditions of the image processing apparatus. The evaluation values in FIG. 16 are merely examples, and different evaluation values may be used according to the object to be photographed, and the configuration or conditions of the image processing apparatus. The method of calculating the deviation amount in FIG. 19 is merely an example, and another calculation method may be used according to the configuration or conditions of the image processing apparatus.

The calculation formulas of the expressions (1) to (15) are merely examples, and another calculation formula may be used according to the configuration or conditions of the image processing apparatus.

Figure 30:
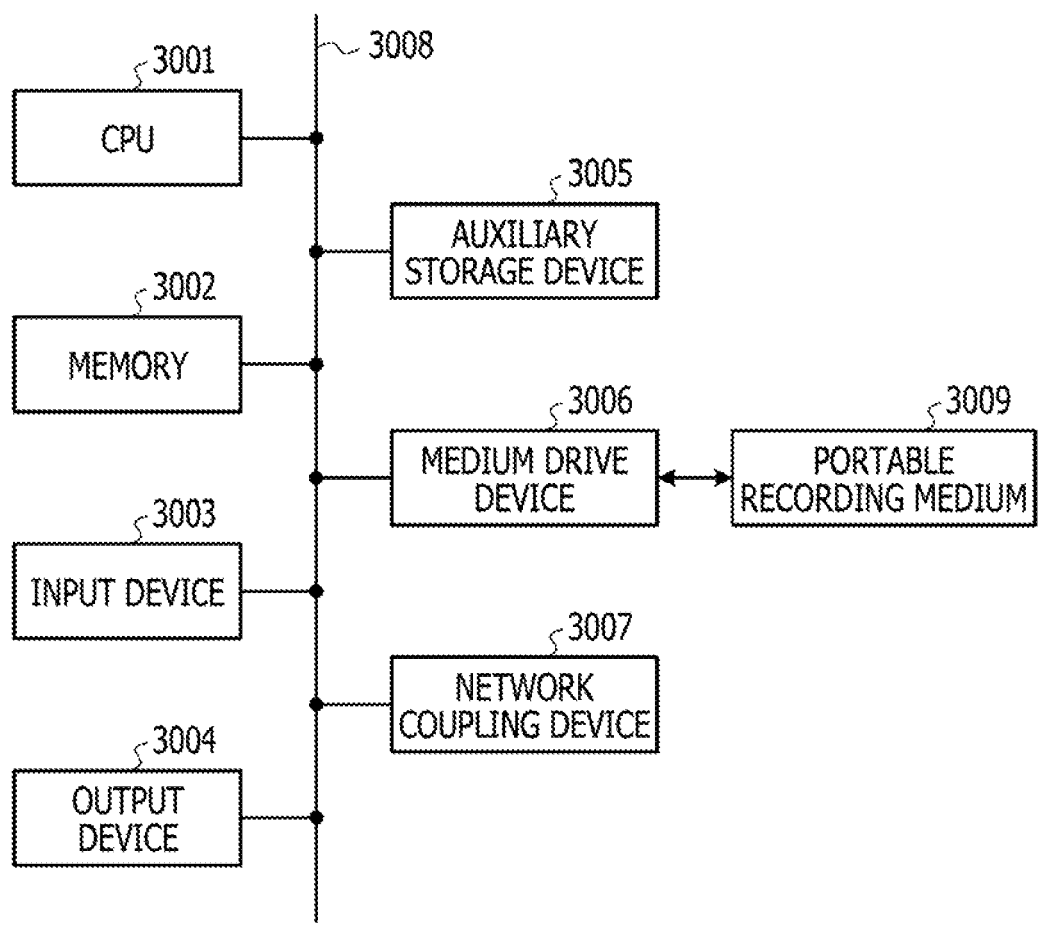
FIG. 30 is a hardware configuration diagram of the information processing apparatus.

FIG. 30 illustrates a hardware configuration example of an information processing apparatus (computer) used as the image processing apparatus in FIGS. 3, 5, and 27. The information processing apparatus in FIG. 30 includes a central processing unit (CPU) 3001, a memory 3002, an input device 3003, an output device 3004, an auxiliary storage device 3005, a medium drive device 3006, and a network coupling device 3007. These components are hardware and are coupled to each other by a bus 3008. The imaging device 502 in FIGS. 5 and 27 may be coupled to the bus 3008.

The memory 3002 is, for example, a semiconductor memory such as a read-only memory (ROM), a random-access memory (RAM), or a flash memory, and stores a program and data used for processing. The memory 3002 may be used as the storing unit 311 in FIG. 3 or the storing unit 511 in FIGS. 5 and 27.

The CPU 3001 (processor) operates as the detection unit 312, the specifying unit 313, the calculation unit 314, and the determination unit 315 in FIG. 3, for example, by executing a program using the memory 3002.

The CPU 3001 also operates as the image acquisition unit 512, the feature line detection unit 513, the line segment detection unit 514, the specifying unit 515, the calculation unit 516, and the determination unit 517 in FIGS. 5 and 27 by executing the program using the memory 3002. The CPU 3001 also operates as the image generation unit 518 and the restoration unit 519 by executing the program using the memory 3002.

The CPU 3001 operates as the guidance information generation unit 2711 in FIG. 27 by executing the program using the memory 3002.

The input device 3003 is, for example, a keyboard, a pointing device, or the like, and is used for inputting an instruction or information from an operator or a user. The output device 3004 is, for example, a display device, a printer, a speaker, or the like, and is used for inquiring or instructing an operator or a user, and outputting a processing result. The processing result may be information indicating the object shape image 537 or the deviation amount 539. The output device 3004 may be used as the output unit 316 in FIG. 3 or the display unit 520 in FIGS. 5 and 27.

The auxiliary storage device 3005 is, for example, a magnetic disk device, an optical disk device, a magneto-optical disk device, a tape device, or the like. The auxiliary storage device 3005 may be a hard disk drive or a flash memory. The information processing apparatus may store a program and data in the auxiliary storage device 3005, and load the program and data into the memory 3002 and use the program and data. The auxiliary storage device 3005 may be used as the storing unit 311 in FIG. 3 or the storing unit 511 in FIGS. 5 and 27.

The medium drive device 3006 drives the portable recording medium 3009 and accesses the recorded contents. The portable recording medium 3009 is a memory device, a flexible disk, an optical disk, a magneto-optical disk, or the like. The portable recording medium 3009 may be a compact disk read-only memory (CD-ROM), a digital versatile disk (DVD), Universal Serial Bus (USB) memory, or the like. An operator or a user may store a program and data in the portable recording medium 3009, and load the program and data into the memory 3002 to use the program and data.

As described above, a computer-readable recording medium that stores a program and data used for image processing is a physical (non-temporary) storage medium such as the memory 3002, the auxiliary storage device 3005, or the portable recording medium 3009.

The network coupling device 3007 is a communication interface circuit that is coupled to a communication network such as a local area network (LAN) or a wide area network (WAN) and performs data conversion accompanying communication. The information processing apparatus may receive the program and data from an external apparatus via the network coupling device 3007, and may load the program and data into the memory 3002 and use the program and data. The network coupling device 3007 may be used as the output unit 316 in FIG. 3.

The information processing apparatus may not include all of the components in FIG. 30, and some of the components may be omitted depending on applications or conditions. For example, when the portable recording medium 3009 or the communication network is not used, the medium drive device 3006 or the network coupling device 3007 may be omitted.

While the embodiment of the disclosure and advantage thereof are described in detail, those skilled in the art may make various changes, additions, and omissions without departing from the scope of the disclosure, which is set forth in the appended claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An image processing apparatus comprising:
a memory configured to store shape information including a plurality of line segments representing a shape of an object; and
a processor coupled to the memory, the processor being configured to
execute a detection processing that includes detecting a plurality of feature lines from a first image including the object photographed by an imaging device from a first photographing position,
execute a specifying processing that includes specifying, based on a positional relationship, a first feature line from among the plurality of feature lines, the first feature line being a feature line representing a defective portion of a shape of an object in the first image, the positional relationship being a relation between a plurality of projection lines and the plurality of feature lines, the plurality of projection line being generated by projecting each of the plurality of line segments onto the first image, each of the plurality of line segments being a line segment that is defined in the shape information associated with the object,
execute a calculation processing that includes
setting a plurality of candidate positions based on the first photographing position, each of the plurality of candidate positions being a candidate for a second photographing position at which a second image including the object is photographed by the imaging device, and
calculating an evaluation value of each of the plurality of candidate positions,
execute a determination processing that includes determining any one of the plurality of candidate positions based on the evaluation value of each of the plurality of candidate positions, and
execute an output processing that includes outputting first information to be used in recognition of the determined candidate position.

2. The image processing apparatus according to claim 1, wherein
the calculation processing is configured to
determine, using each of a predetermined number of candidate positions that are candidates for the second photographing position as a viewpoint, whether or not a specific line segment used to generate a projection line corresponding to the first feature line representing the defective portion among the plurality of line segments is observed from the viewpoint,
exclude the candidate position used as the viewpoint when the specific line segment is not observed from the viewpoint, and
select the candidate position used as the viewpoint when the specific line segment is observed from the viewpoint, thereby extracting the plurality of candidate positions from among the predetermined number of candidate positions.

3. The image processing apparatus according to claim 2, wherein
the calculation processing is configured to calculate the evaluation value of each of the plurality of candidate positions based on a distance between the first photographing position and each of the plurality of candidate positions.

4. The image processing apparatus according to claim 2, wherein the first information is an object shape image configured to be observed from the determined candidate position, the object shape image representing the shape of the object represented by the plurality of line segments,
wherein the processor is configured to
execute an image generation processing that includes generating the object shape image, and
execute a guidance information generation processing that includes generating guidance information for guiding a user holding the imaging device from the first photographing position to the determined candidate position, and
wherein the output processing is configured to output the object shape age and the guidance information.

5. The image processing apparatus according to claim 2, wherein the imaging device is configured to generate the second image by photographing the object at the determined candidate position,
wherein the detection processing is configured to detect a feature line representing the defective portion from the second image,
wherein the processor is configured to
execute a restoration processing that includes
restoring a three-dimensional line segment using the feature line representing the defective portion detected from the first image and the feature line representing the defective portion detected from the second image, and
obtaining a deviation amount between a position of the specific line segment and a position of the three-dimensional line segment,
wherein the output processing is configured to output information indicating the deviation amount.

6. The image processing apparatus according to claim 5, wherein the determination processing is configured to
determine a third photographing position for photographing the defective portion based on the specific line segment and the three-dimensional line segment, and wherein the output processing is configured to output information that enables recognition of the third photographing position.

7. An image processing method executed by a computer, the method comprising:
executing a detection processing that includes detecting a plurality of feature lines from a first image photographed by an imaging device from a first photographing position;
executing a specifying processing that includes specifying, based on a positional relationship, a first feature line from among the plurality of feature lines, the first feature line being a feature line representing a defective portion of a shape of an object in the first image, the positional relationship being a relation between a plurality of projection lines and the plurality of feature lines, the plurality of projection line being generated by projecting each of a plurality of line segments onto the first image, each of the plurality of line segments being a line segment that is defined in shape information associated with the object and that represents the shape of the object;
executing a calculation processing that includes
setting a plurality of candidate positions based on the first photographing position, each of the plurality of candidate positions being a candidate for a second photographing position at which a second image including the object is photographed by the imaging device, and
calculating an evaluation value of each of the plurality of candidate positions;
executing a determination processing that includes determining any one of the plurality of candidate positions based on the evaluation value of each of the plurality of candidate positions; and
executing an output processing that includes outputting first information to be used in recognition of the determined candidate position.

8. The image processing method according to claim 7, wherein
the calculation processing is configured to
determine, using each of a predetermined number of candidate positions that are candidates for the second photographing position as a viewpoint, whether or not a specific line segment used to generate a projection line corresponding to the first feature line representing the defective portion among the plurality of line segments is observed from the viewpoint,
exclude the candidate position used as the viewpoint when the specific line segment is not observed from the viewpoint, and
select the candidate position used as the viewpoint when the specific line segment is observed from the viewpoint, thereby extracting the plurality of candidate positions from among the predetermined number of candidate positions.

9. The image processing method according to claim 7, wherein
the calculation processing is configured to calculate the evaluation value of each of the plurality of candidate positions based on a distance between the first photographing position and each of the plurality of candidate positions.

10. The image processing method according to claim 8, wherein the first information is an object shape image configured to be observed from the determined candidate position, the object shape image representing the shape of the object represented by the plurality of line segments, wherein the image processing method further comprises:
executing an image generation processing that includes generating the object shape image; and
executing a guidance information generation processing that includes generating guidance information for guiding a user holding the imaging device from the first photographing position to the determined candidate position; and
wherein the output processing is configured to output the object shape image and the guidance information.

11. The image processing method according to claim 8, wherein the imaging device is configured to generate the second image by photographing the object at the determined candidate position,
wherein the detection processing is configured to detect a feature line representing the defective portion from the second image,
wherein the image processing method further comprises:
executing a restoration processing that includes
restoring a three-dimensional line segment using the feature line representing the defective portion detected from the first image and the feature line representing the defective portion detected from the second image, and
obtaining a deviation amount between a position of the specific line segment and a position of the three-dimensional line segment,
wherein the output processing is configured to output information indicating the deviation amount.

12. The image processing method according to claim 11, wherein the determination processing is configured to determine a third photographing position for photographing the defective portion based on the specific line segment and the three-dimensional line segment, and
wherein the output processing is configured to output information that enables recognition of the third photographing position.

13. A non-transitory computer-readable storage medium for storing a program which causes a processor to perform processing, the processing comprising:
executing a detection processing that includes detecting a plurality of feature lines from a first image photographed by an imaging device from a first photographing position;
executing a specifying processing that includes specifying, based on a positional relationship, a first feature line from among the plurality of feature lines, the first feature line being a feature line representing a defective portion of a shape of an object in the first image, the positional relationship being a relation between a plurality of projection lines and the plurality of feature lines, the plurality of projection line being generated by projecting each of a plurality of line segments onto the first image, each of the plurality of line segments being a line segment that is defined in shape information associated with the object and that represents the shape of the object;
executing a calculation processing that includes
setting a plurality of candidate positions, that are candidates for a second photographing position at which a second image including the object is photographed by the imaging device, based on the first photographing position, and
calculating an evaluation value of each of the plurality of candidate positions;
executing a determination processing that includes determining any one of the plurality of candidate positions based on the evaluation value of each of the plurality of candidate positions; and
executing an output processing that includes outputting first information to be used in recognition of the determined candidate position.

14. The non-transitory computer-readable storage medium according to claim 13, wherein
the calculation processing is configured to
determine, using each of a predetermined number of candidate positions that are candidates for the second photographing position as a viewpoint, whether or not a specific line segment used to generate a projection line corresponding to the feature line representing the defective portion among the plurality of line segments is observed from the viewpoint,
exclude the candidate position used as the viewpoint when the specific line segment is not observed from the viewpoint, and
select the candidate position used as the viewpoint when the specific line segment is observed from the viewpoint, thereby extracting the plurality of candidate positions from among the predetermined number of candidate positions.

15. The non-transitory computer-readable storage medium according to claim 13, wherein
the calculation processing is configured to calculate the evaluation value of each of the plurality of candidate positions based on a distance between the first photographing position and each of the plurality of candidate positions.

16. The non-transitory computer-readable storage medium according to claim 14,
wherein the first information is an object shape image configured to be observed from the determined candidate position, the object shape image representing the shape of the object represented by the plurality of line segments,
wherein the image processing method further comprises:
executing an image generation processing that includes generating the object shape image; and
executing a guidance information generation processing that includes generating guidance information for guiding a user holding the imaging device from the first photographing position to the determined candidate position; and
wherein the output processing is configured to output the object shape image and the guidance information.

17. The non-transitory computer-readable storage medium according to claim 14,
wherein the imaging device is configured to generate the second image by photographing the object at the determined candidate position,
wherein the detection processing is configured to detect a feature line representing the defective portion from the second image,
wherein the image processing method further comprises:
executing a restoration processing that includes
restoring a three-dimensional line segment using the feature line representing the defective portion detected from the first image and the feature line representing the defective portion detected from the second image, and obtaining a deviation amount between a position of the specific line segment and a position of the three-dimensional line segment, wherein the output processing is configured to output information indicating the deviation amount.

18. The non-transitory computer readable storage medium according to claim 17, wherein the determination processing is configured to determine a third photographing position for photographing the defective portion based on the specific line segment and the three-dimensional line segment, and wherein the output processing is configured to output information that enables recognition of the third photographing position.

* * * * *